(12) United States Patent
Yamada et al.

(10) Patent No.: US 11,968,347 B2
(45) Date of Patent: Apr. 23, 2024

(54) IMAGE PROCESSING APPARATUS, IMAGE PROCESSING METHOD, AND STORAGE MEDIUM STORING PROGRAM

(71) Applicant: CANON KABUSHIKI KAISHA, Tokyo (JP)

(72) Inventors: Akitoshi Yamada, Kanagawa (JP); Kentaro Yano, Kanagawa (JP); Akihiko Nakatani, Kanagawa (JP); Takashi Nakamura, Kanagawa (JP); Hidetsugu Kagawa, Kanagawa (JP); Kouta Murasawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/962,404

(22) Filed: Oct. 7, 2022

(65) Prior Publication Data

US 2023/0124689 A1  Apr. 20, 2023

(30) Foreign Application Priority Data

Oct. 18, 2021 (JP) .................................. 2021-170468
Jun. 17, 2022 (JP) .................................. 2022-098198

(51) Int. Cl.
*H04N 1/60* (2006.01)

(52) U.S. Cl.
CPC ......... *H04N 1/6058* (2013.01); *H04N 1/6013* (2013.01); *H04N 1/6016* (2013.01); *H04N 2201/0094* (2013.01)

(58) Field of Classification Search
CPC .. H04N 1/6058; H04N 1/6013; H04N 1/6016; H04N 2201/0094; H04N 1/6066; H04N 1/6063; H04N 1/648
See application file for complete search history.

(56) References Cited

U.S. PATENT DOCUMENTS 6,016,359 A * 1/2000 Komatsu ............... G06T 11/001
                                                        358/518
7,075,679 B2   7/2006 Goto et al. ................. B41J 2/52
(Continued)

FOREIGN PATENT DOCUMENTS

EP   1909484 A1 *  4/2008  ........... G06T 11/001
EP   2120449 B1 *  9/2017  ............... H04N 1/60
(Continued)

OTHER PUBLICATIONS

Partial European Search Report dated Mar. 9, 2023 in counterpart EP Application No. 22201099.3.
(Continued)

*Primary Examiner* — Ted W Barnes
(74) *Attorney, Agent, or Firm* — Venable LLP

(57) ABSTRACT

An image processing apparatus comprising: a decision unit configured to decide a first color mapping method to a print color gamut for a first partial original based on a pixel value included in the first partial original and the print color gamut of a print unit and decide a second color mapping method to a print color gamut for a second partial original based on a pixel value included in the second partial original and the print color gamut of the print unit; and a color conversion unit configured to perform color conversion of the first partial original by the first color mapping method decided, and perform color conversion of the second partial original by the second color mapping method decided.

26 Claims, 13 Drawing Sheets

(56) References Cited

U.S. PATENT DOCUMENTS

| | | | |
|---|---|---|---|
| 7,145,693 B2 | 12/2006 | Kagawa | B41J 2/21 |
| 7,274,491 B2 | 9/2007 | Yamada et al. | G06T 5/00 |
| 7,339,703 B2 | 3/2008 | Kagawa | B41J 5/30 |
| 7,342,684 B2 | 3/2008 | Imafuku et al. | G06T 5/00 |
| 7,636,178 B2 | 12/2009 | Nakatani et al. | H04N 1/60 |
| 7,643,178 B2 | 1/2010 | Yamada et al. | G06T 5/00 |
| 7,688,489 B2 | 3/2010 | Nagoshi et al. | G03F 3/08 |
| 7,869,092 B2 | 1/2011 | Nakatani et al. | H04N 1/60 |
| 7,912,280 B2 | 3/2011 | Miyagi et al. | G06K 9/40 |
| 8,139,849 B2 | 3/2012 | Miyagi et al. | G06K 9/40 |
| 8,179,567 B2 | 5/2012 | Nakamura | G03F 3/08 |
| 8,310,723 B2 | 11/2012 | Nakatani et al. | H04N 1/60 |
| 8,508,794 B2 | 8/2013 | Nakatani | H04N 1/60 |
| 8,616,668 B2 | 12/2013 | Saito et al. | B41J 2/21 |
| 8,899,715 B2 | 12/2014 | Saito et al. | B41J 2/205 |
| 8,953,234 B2 | 2/2015 | Iguchi et al. | H04N 1/46 |
| 9,055,252 B2 | 6/2015 | Miyake et al. | H04N 1/401 |
| 9,111,204 B2 | 8/2015 | Fujita et al. | H04N 1/60 |
| 9,162,477 B2 | 10/2015 | Ikeda et al. | B41J 2/205 |
| 9,554,019 B2 | 1/2017 | Kagawa | H04N 1/46 |
| 9,623,671 B2 | 4/2017 | Yamada et al. | B41J 2/21 |
| 9,692,944 B2 | 6/2017 | Goto et al. | H04N 1/60 |
| 9,694,598 B2 | 7/2017 | Ishikawa et al. | B41J 2/21 |
| 10,022,983 B2 | 7/2018 | Yamada et al. | B41J 2/21 |
| 10,748,246 B2 | 8/2020 | Hashii et al. | G06T 1/00 |
| 11,223,809 B2* | 1/2022 | Wei | G06T 7/90 |
| 11,323,576 B2 | 5/2022 | Kagawa et al. | H04N 1/60 |
| 11,350,068 B2* | 5/2022 | Wei | H04N 9/69 |
| 11,412,107 B2 | 8/2022 | Tsuchiya et al. | H04N 1/60 |
| 2004/0056835 A1* | 3/2004 | Curry | H04N 1/6019 345/100 |
| 2007/0110301 A1* | 5/2007 | Wu | G06V 30/412 382/162 |
| 2007/0291289 A1* | 12/2007 | Kuo | H04N 1/6055 358/1.9 |
| 2008/0218779 A1* | 9/2008 | Shirasawa | H04N 1/603 358/1.9 |
| 2010/0157338 A1 | 6/2010 | Nakamura et al. | H04N 1/60 |
| 2010/0272355 A1 | 10/2010 | Monga et al. | G06K 9/00 |
| 2011/0069077 A1* | 3/2011 | Chen | H04N 1/62 345/589 |
| 2011/0205594 A1* | 8/2011 | Chida | G06F 3/1208 358/1.18 |
| 2011/0316920 A1 | 12/2011 | Torigoe et al. | B41J 29/38 |
| 2012/0081443 A1 | 4/2012 | Ono et al. | B41J 2/205 |
| 2013/0194321 A1* | 8/2013 | Wan | G06T 11/40 382/166 |
| 2013/0321873 A1* | 12/2013 | Ido | G06K 15/1878 358/3.27 |
| 2017/0111551 A1 | 4/2017 | Morovic et al. | H04N 1/60 |
| 2018/0025477 A1* | 1/2018 | Min | H04N 9/68 345/590 |
| 2020/0053251 A1 | 2/2020 | Yamashita | H04N 1/60 |
| 2020/0076987 A1* | 3/2020 | Ichihashi | G06F 3/1208 |
| 2022/0253655 A1 | 8/2022 | Abe et al. | G06K 15/02 |
| 2022/0358777 A1 | 11/2022 | Mizoguchi et al. | G06V 30/19 |
| 2023/0251807 A1* | 8/2023 | Okayama | G06F 3/1207 358/1.15 |

FOREIGN PATENT DOCUMENTS

| | | | | |
|---|---|---|---|---|
| JP | H07-203234 | | 8/1995 | |
| JP | 2002218271 A | * | 8/2002 | |
| JP | 2007-295060 | | 11/2007 | |
| JP | 2010-050832 | | 3/2010 | |
| JP | 2010-220116 | | 9/2010 | |
| JP | 2014-033274 | | 2/2014 | |
| JP | 5494616 B2 | * | 5/2014 | H04N 1/603 |
| JP | 2019159053 A | * | 9/2019 | G09G 5/02 |
| JP | 2020-027948 | | 2/2020 | |

OTHER PUBLICATIONS

Extended European Search Report dated Jul. 24, 2023 in counterpart EP Application No. 22201099.3.

Office Action dated Mar. 1, 2024 in counterpart Japanese Application No. 2022-098198, together with English translation thereof.

* cited by examiner

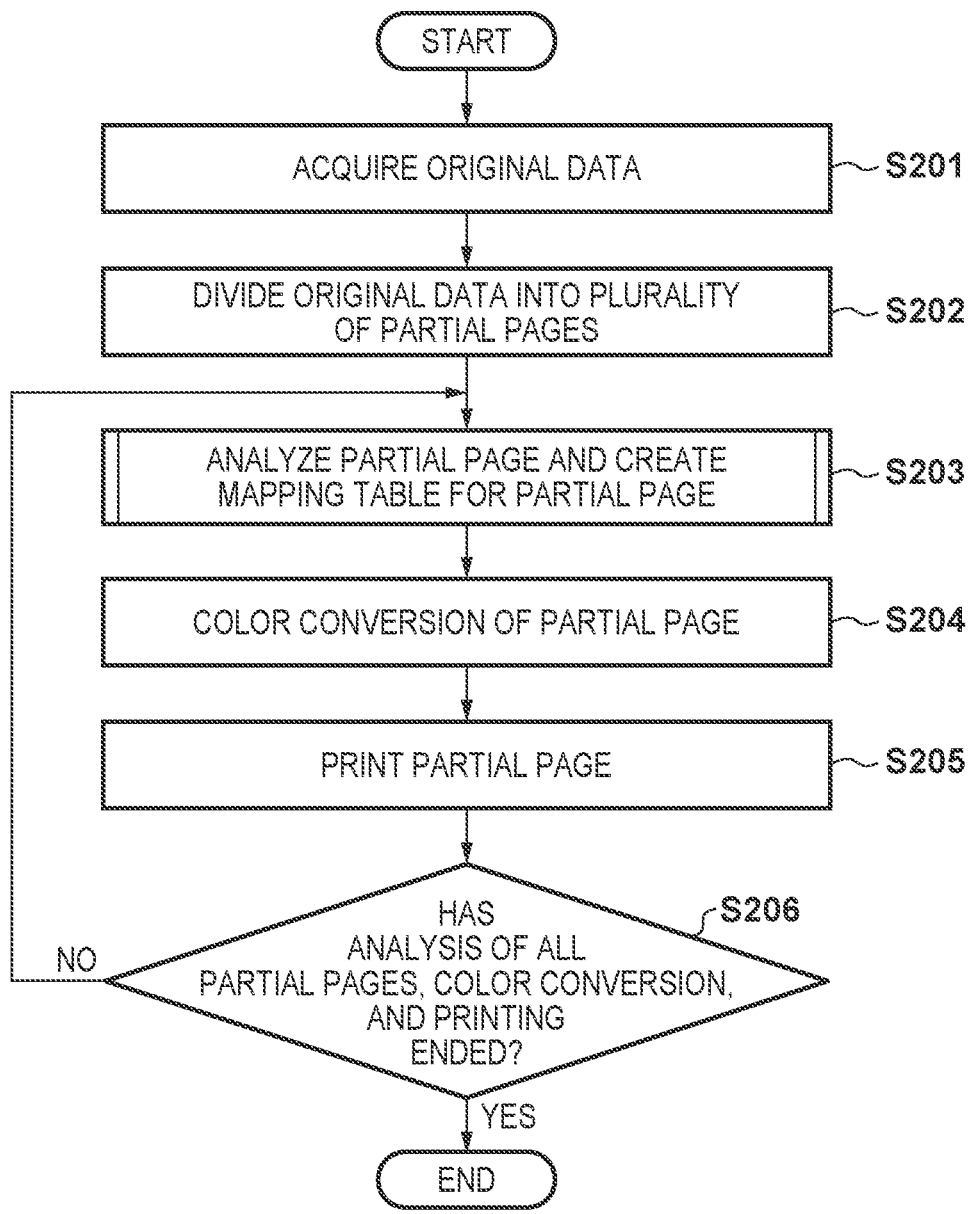

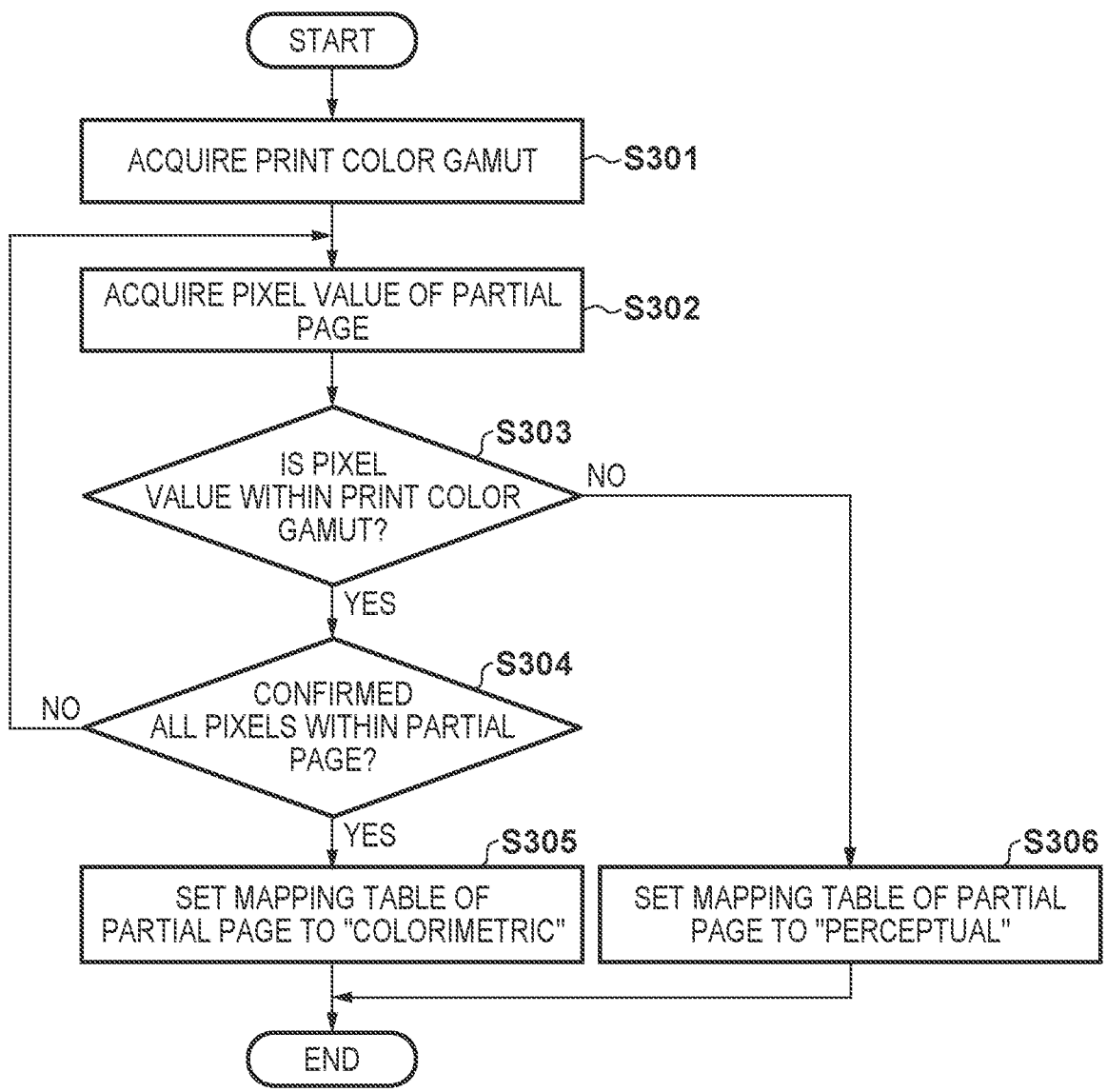

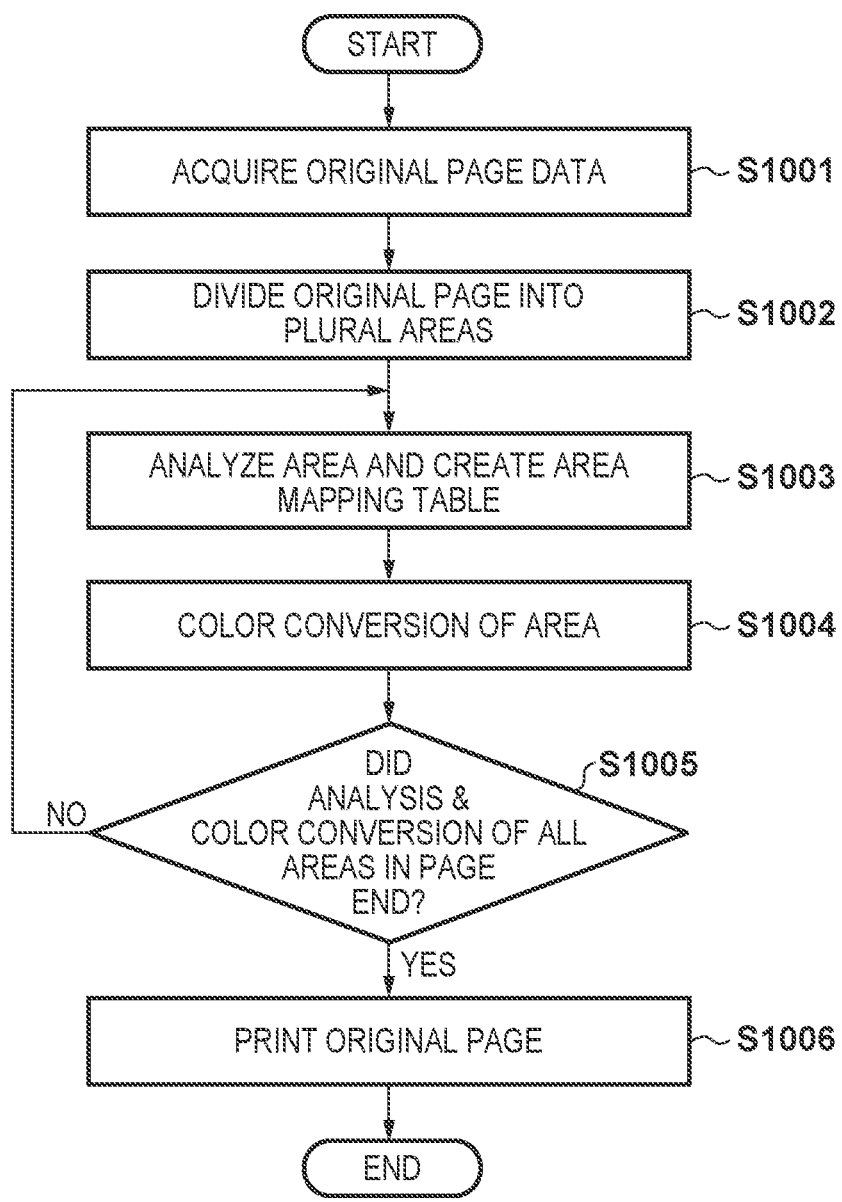

ORIGINAL

F I G. 13
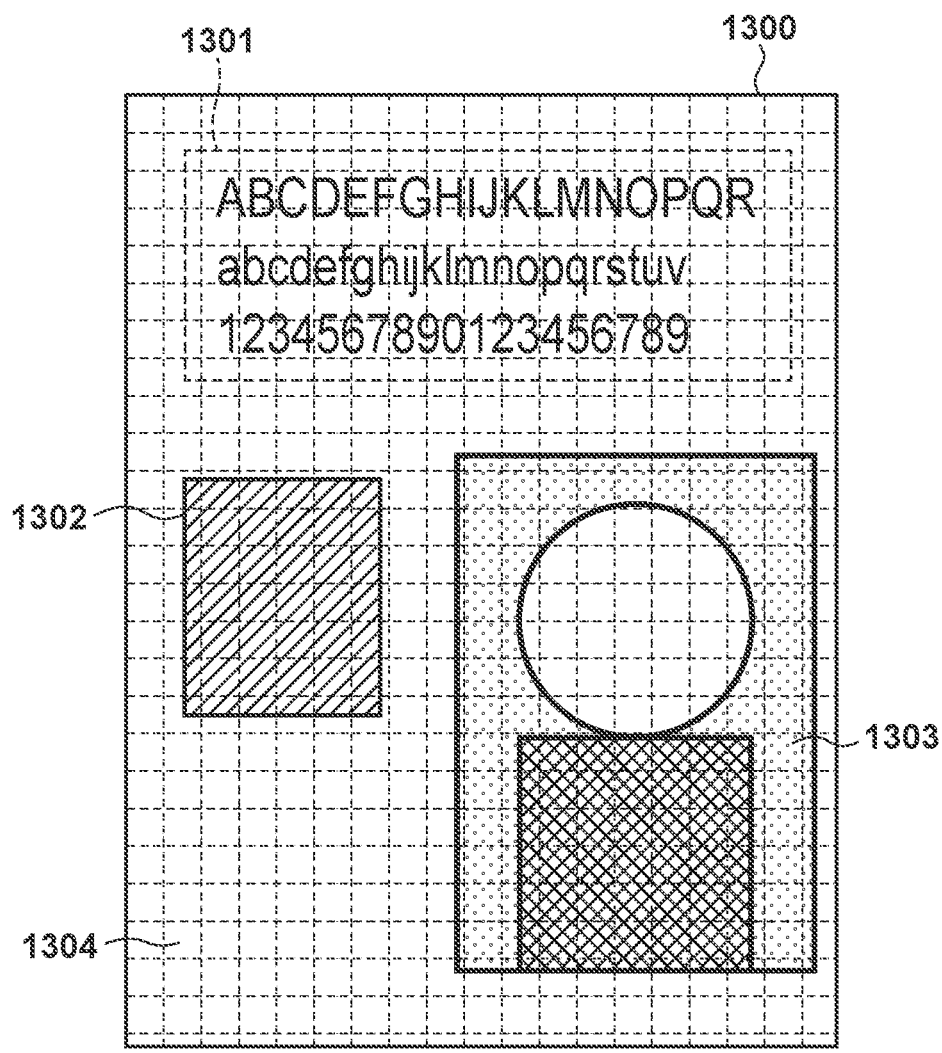
ORIGINAL

ORIGINAL

IMAGE PROCESSING APPARATUS, IMAGE PROCESSING METHOD, AND STORAGE MEDIUM STORING PROGRAM

BACKGROUND OF THE INVENTION

Field of the Invention

The present invention relates to an image processing apparatus capable of executing color mapping, an image processing method, and a storage medium storing a program.

Description of the Related Art

There is known a printer that receives a digital original described in a predetermined color space, performs, for each color in the color space, mapping to a color gamut that can be reproduced by the printer, and outputs. Japanese Patent Laid-Open No. 2020-27948 describes "perceptual" mapping and "absolute colorimetric" mapping. Also, Japanese Patent Laid-Open No. 07-203234 describes deciding the presence/absence of color space compression and the compression direction for an input color image signal.

SUMMARY OF THE INVENTION

The present invention provides an image processing apparatus configured to appropriately perform color mapping to a print color gamut, an image processing method, and a storage medium storing a program.

The present invention in one aspect provides an image processing apparatus comprising: an acquisition unit configured to acquire original data of a print target of a print unit, which is formed by one page or a plurality of pages; a division unit configured to divide the original data into a plurality of partial original data including at least a first partial original and a second partial original; a decision unit configured to decide a first color mapping method to a print color gamut for the first partial original based on a pixel value included in the first partial original and the print color gamut of the print unit and decide a second color mapping method to the print color gamut for the second partial original based on a pixel value included in the second partial original and the print color gamut of the print unit; and a color conversion unit configured to perform color conversion of the first partial original by the first color mapping method decided by the decision unit, and perform color conversion of the second partial original by the second color mapping method decided by the decision unit.

The present invention in one aspect provides an image processing apparatus comprising: an acquisition unit configured to acquire a pixel value from original data of a print target of a print unit, which is formed by a plurality of pages; a decision unit configured to decide, based on the pixel value acquired by the acquisition unit and a print color gamut of the print unit, a color mapping method to the print color gamut for at least one of a page included in the plurality of pages and a portion in the page; and a color conversion unit configured to perform color conversion of the original data by the color mapping method decided by the decision unit, wherein a plurality of color mapping methods as a target to be decided by the decision unit include a first color mapping method of compressing a color space in the print color gamut, and a second color mapping method different from the first color mapping method, and the decision unit decides the color mapping method to the print color gamut based on whether a pixel value outside the print color gamut is included in a plurality of pixel values acquired by the acquisition unit.

According to the present invention, it is possible to appropriately perform color mapping to a print color gamut.

Further features of the present invention will become apparent from the following description of exemplary embodiments with reference to the attached drawings.

BRIEF DESCRIPTION OF THE DRAWINGS

FIG. 2 is a flowchart showing print processing in an MFP;
FIG. 3 is a flowchart showing mapping table creation processing in step S203;
FIG. 10 is a flowchart showing mapping table creation processing in step S203;
FIG. 13 is a view showing an image of tile division of an original page.

DESCRIPTION OF THE EMBODIMENTS

Figure 1:
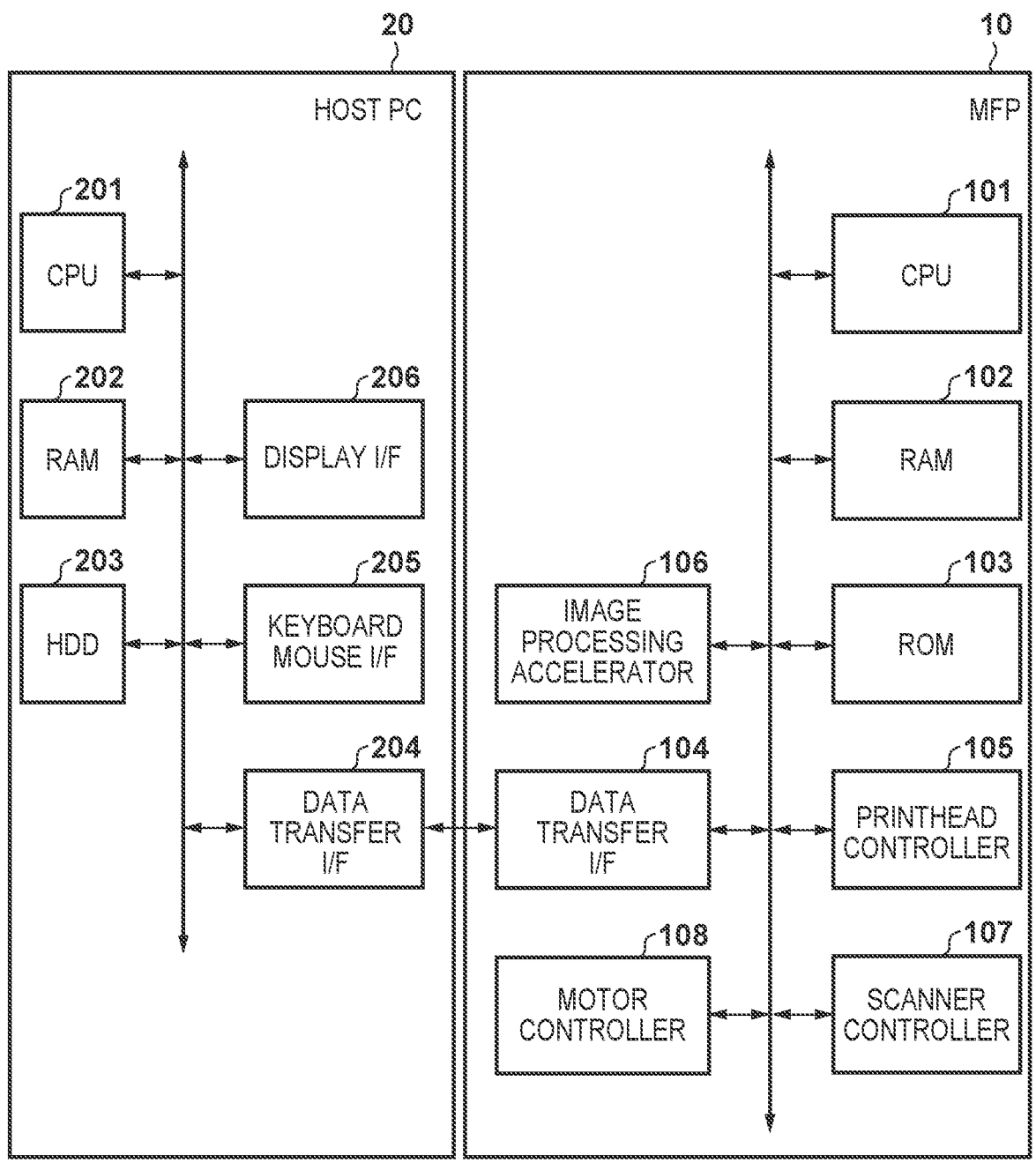
FIG. 1 is a block diagram showing the configuration of a print system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

If "perceptual" mapping in Japanese Patent Laid-Open No. 2020-27948 is performed, chroma may lower due to the mapping even in a color that can be reproduced by a printer in the color space of the digital original. Also, if "absolute colorimetric" mapping in Japanese Patent Laid-Open No. 2020-27948 is performed, a color difference, which exists on the digital original, between a plurality of colors outside the reproduction color gamut of a printer may lower due to the mapping. In Japanese Patent Laid-Open No. 07-203234, since compression is uniquely performed for an entire input color image signal, there remain concerns about the compression effect for a plurality of pages or an input of one page formed by a plurality of areas.

According to the present disclosure, it is possible to appropriately perform color mapping to a print color gamut.

First Embodiment

FIG. 1 is a block diagram showing an example of the configuration of a print system according to this embodiment. As shown in FIG. 1, the print system is configured to include an MFP (Multi Function Printer) (image processing apparatus) 10, and a host PC (information processing apparatus) 20 serving as a host apparatus for the MFP. The MFP 10 is a printer having a plurality of functions such as a printer function and a scanner function in the main body, and sometimes has a copy function that is performed by cooperation of the two functions. Data created by an application on the host PC 20 or data acquired by the scanner (image reading device) of the MFP 10 can be print target data of the MFP 10.

The host PC 20 is configured to mainly include the following elements. A CPU 201, for example, reads out a program held in an HDD 203 or a RAM 202 and executes, thereby implementing an operation according to this embodiment. The RAM 202 is a volatile storage and temporarily holds programs and data. The HDD 203 is a nonvolatile storage and holds programs and data. A data transfer interface 204 controls data transmission/reception to/from the MFP 10. As a connection method for the data transmission/reception, for example, wired connection such as a USB, IEEE1394, or LAN or wireless connection such as Bluetooth or Wi-Fi is used. A keyboard/mouse interface 205 is an interface that controls an HID (Human Interface Device) such as a keyboard or a mouse and can accept input of an instruction or a setting by the user. A display interface 206 controls display on a display (not shown).

On the other hand, the MFP 10 is configured to mainly include the following elements. A CPU 101, for example, reads out a program held in a ROM 103 or a RAM 102 and executes, thereby implementing an operation according to this embodiment. The RAM 102 is a volatile storage and temporarily holds programs and data. The ROM 103 is a nonvolatile storage and holds table data and programs used in processing according to this embodiment. A data transfer interface 104 controls data transmission/reception to/from the PC 20. A printhead controller 105 controls, for a printhead (not shown), a heating operation of heaters mounted in the printhead based on print data and causes the printhead to discharge ink droplets. In this embodiment, the MFP 10 will be described as a printer configured to print an image on a print medium by an inkjet printing method. However, a configuration of another printing method may be employed, and, for example, a configuration for printing using an electrophotographic method may be used. More specifically, the printhead controller 105 is configured to read out control parameters and print data from predetermined addresses of the RAM 102. If the CPU 101 writes control parameters and print data at predetermined addresses of the RAM 102, processing is activated by the printhead controller 105, and the heating operation of the heaters mounted in the printhead is performed.

An image processing accelerator 106 is formed by hardware, and executes image processing at a higher speed than the CPU 101. More specifically, the image processing accelerator 106 is configured to read out parameters and data necessary for image processing from predetermined addresses of the RAM 102. If the CPU 101 writes parameters and print data at predetermined addresses of the RAM 102, processing is activated by the image processing accelerator 106, and predetermined image processing is performed. Note that the image processing accelerator 106 is not always a necessary element, and the above-described write processing of parameters and data and the image processing may be executed only by the processing of the CPU 101 in accordance with the specifications of the printer.

A scanner controller 107 instructs a scanner unit (not shown) to irradiate an original with light and transmit, to the scanner controller 107, light amount information obtained by acquiring reflected light by an image capturing element such as a CCD. More specifically, if the CPU 101 writes control parameters and a read data write address at predetermined addresses of the RAM 102, processing is activated by the scanner controller 107. Then, light emission control of an LED mounted in the scanner unit, light amount information acquisition from the scanner unit, and write of the light amount information to the read data write address and subsequent addresses in the RAM 102 are performed.

A motor controller 108 controls the motor operations of a plurality of motor units (not shown). Here, the motors include a motor configured to move the printhead relative to print paper, and a motor configured to move the scanner unit relative to a read original. Motors of other types may be included, and, for example, a motor used for printhead maintenance is included.

The block configurations of the host PC 20 and the MFP 10 are not limited to the configurations shown in FIG. 1, and a configuration according to a function to be executed by the host PC 20 and the MFP 10 can appropriately be included. For example, the MFP 10 may include a configuration for implementing a finisher function such as binding processing.

FIG. 2 is a flowchart showing print processing in the MFP 10. Processing shown in FIG. 2 is implemented by, for example, the CPU 101 reading out a program stored in the ROM 103 and executing.

In step S201, the CPU 101 acquires original data as a print target. More specifically, the CPU 101 acquires original data from the data transfer interface 204 of the host PC 20 via the data transfer interface 104 of the MFP 10. Here, the original data is assumed to be document data formed by a plurality of pages.

In step S202, the CPU 101 divides the original data into a plurality of "partial pages". Here, "partial page" in this embodiment will be described. As described above, the original data as the print target is document data formed by a plurality of pages. "Partial page" represents how the plurality of pages included in the document data should be put together and subjected to mapping table creation to be described later. For example, assume that the document data is formed by first to third pages. If each page is a target of mapping table creation, each of the first page, the second page, and the third page is a "partial page". If the first page and the second page, and the third pages are targets of mapping table creation, the first page and the second page form a "partial page", and the third page is also a "partial page". Also, the "partial page" is not limited to a unit on a page basis included in the document data. For example, a partial area of the first page may be a "partial page". This configuration will be described in the fourth embodiment. In step S202, the original data is divided into a plurality of "partial pages" in accordance with a predetermined unit of "partial pages". Note that the unit of "partial pages" may be designated by the user. In this embodiment, an example in which a plurality of pages included in document data are divided into the pages, and each page is defined as a "partial page" will be described.

Subsequent steps S203 to S206 form loop processing to be executed for each partial page. In step S203, the CPU 101 analyzes a partial page of interest and creates a mapping table for the partial page. Mapping table creation processing will be described later with reference to FIG. 3.

More specifically, the created mapping table is a three-dimensional lookup table configured to calculate a combination of suitable output pixel values (Rout, Gout, Bout) in correspondence with a combination of input pixel values (Rin, Gin, Bin). For example, if each of the input values Rin, Gin, and Bin has 256 tones, a table Table1[256][256][256][3] having a total of 256×256×256=16,777,216 sets of output values is created.

In step S204, the CPU 101 performs color conversion of the partial page using the partial page mapping table created in step S203. More specifically, for each pixel of the image formed by the RGB pixel values of the partial page divided in step S202, the color conversion is implemented by the following equations.

$Rout=Table1[Rin][Gin][Bin][0]$ $Gout=Table1[Rin][Gin][Bin][1]$ $Bout=Table1[Rin][Gin][Bin][2]$ The table size may be reduced by decreasing the number of grids of the lookup table from 256 grids to, for example, 16 grids and deciding output values by interpolating table values of a plurality of grids.

Next, in step S205, the CPU 101 performs printing of the partial page. More specifically, four processes (print control) including ink color separation, output characteristic conversion, quantization, and printing are performed for each pixel of the converted image data of the partial page converted in step S204.

Ink color separation is processing of converting Rout, Gout, and Bout that are the output values of color conversion processing into output values of ink colors to be printed by the inkjet printing method. In this embodiment, for example, printing using four color inks of cyan, magenta, yellow, and black is assumed. This conversion can use various implementation methods. For example, as in color conversion processing, a three-dimensional lookup table is used to calculate a combination of suitable ink color pixel values (C, M, Y, K) in correspondence with a combination of output pixel values (Rout, Gout, Bout). For example, a three-dimensional lookup table Table2[256][256][256][4] as follows is used.

$C=Table2[Rout][Gout][Bout][0]$ $M=Table2[Rout][Gout][Bout][1]$ $Y=Table2[Rout][Gout][Bout][2]$ $K=Table2[Rout][Gout][Bout][3]$ The table size may be reduced by decreasing the number of grids of the lookup table from 256 grids to, for example, 16 grids and deciding output values by interpolating table values of a plurality of grids.

Next, output characteristic conversion is processing of converting the density of each ink color into a print dot count ratio. More specifically, for example, the densities of colors each having 256 tones are converted into dot count ratios Cout, Mout, Yout, and Kout in 1024 tones for each color. For this purpose, for example, a one-dimensional lookup table Table3 [4] [256] as follows in which a suitable print dot count ratio is set in correspondence with the density of each ink color is used.

$Cout=Table3[0][C]$ $Mout=Table3[1][M]$ $Yout=Table3[2][Y]$ $Kout=Table3[3][K]$

The table size may be reduced by decreasing the number of grids of the lookup table from 256 grids to, for example, 16 grids and deciding output values by interpolating table values of a plurality of grids.

Next, quantization is processing of converting the print dot count ratios Cout, Mout, Yout, and Kout of the ink colors into On/Off of the print dot of each actual pixel. As the method of quantization, various methods, for example, an error diffusion method and a dither method can be used. For example, by the dither method, the quantization is implemented by the following equations.

$Cdot=Halftone[Cout][x][y]$ $Mdot=Halftone[Mout][x][y]$ $Ydot=Halftone[Yout][x][y]$ $Kdot=Halftone[Kout][x][y]$ The values are compared with a threshold according to each pixel position (x, y), thereby implementing On/Off of the print dot of each ink color. Here, assume that each of Cout, Mout, Yout, and Kout is expressed by 10 bits and takes a range from 0 to 1023. Hence, the occurrence probabilities of print dots are Cout/1023, Mout/1023, Yout/1023, and Kout/1023.

Finally, the generated print image is printed.

Next, in step S206, the CPU 101 determines whether analysis and printing of all partial pages are ended. Upon determining that analysis and printing of all partial pages are ended, the processing shown in FIG. 2 is ended. On the other hand, upon determining that analysis and printing of all partial pages are not ended, the process returns to step S203 to perform subsequent processing for the next partial page of interest.

FIG. 3 is a flowchart showing mapping table creation processing in step S203 of FIG. 2. In step S301, the CPU 101 acquires a print color gamut that can be reproduced in printing by the MFP 10. This is information representing the range of colors that can be reproduced in printing by the MFP 10, and changes depending on print paper (plain paper or photo paper) or a print mode (draft, standard, fine, or the like). In general, the print color gamut is wider in printing for photo paper than in printing for plain paper, and the print color gamut is wider in the standard mode than in the draft mode, and wider in the fine mode than in the standard mode in many cases. This is because the larger the ink amount used in printing is, and the larger the ink amount existing on the surface of print paper in printed ink, the better the color development of the print result is.

As the print color gamut expression method, various methods can be used. For example, an expression method using a set of lightness (L), chroma (C), and hue (H) is used. More specifically, a method of describing a maximum chroma for each lightness and each hue is used, which is a method using a table shown below.

$Cmax\_Table[L][H](L=0$ to $100, H=0$ to $360)$

Actually, since L takes 101 values, and H takes 360 values, a total of 36,360 pieces of C information are obtained. Note that to decrease the table capacity, the tones of L or H may be reduced.

In this embodiment, for example, the print color gamut is stored in the ROM 103 of the MFP 10 in advance, and the CPU 101 reads out the stored print color gamut. The print color gamut itself is determined in advance as the performance of the printing apparatus, as described above. Hence, for example, print patches are printed in advance using RGB values, and a maximum chroma corresponding to each lightness and each hue are set based on the measurement result of the print patches.

Steps S302 to S304 form loop processing to be executed for each pixel in a partial page.

In step S302, the CPU 101 acquires the pixel value of one pixel in the partial page. In step S303, the CPU 101 determines whether the pixel value acquired in step S302 exists in the print color gamut acquired in step S301. More specifically, input RGB values are converted into the above-described lightness, chroma, and hue. RGB values used in general are sRGB values. Hence, in this embodiment, an example will be described assuming that the values are sRGB values. For example, a conversion table sRGBtoLCH[Rin][Gin][Bin][0 to 2] that converts sRGB values into the above-described lightness, chroma, and hue is stored in the ROM 103 of the MFP 10 in advance.

The CPU 101 calculates Lin, Cin, and Hin as follows.

$$Lin = sRGBtoLCH[Rin][Gin][Bin][0]$$

$$Cin = sRGBtoLCH[Rin][Gin][Bin][1]$$

$$Hin = sRGBtoLCH[Rin][Gin][Bin][2]$$

The CPU 101 performs comparison processing as shown by the following equations, thereby determining whether the pixel value exists in the print color gamut.

If (Cin<=Cmax_Table[Lin][Hin])→in the print color gamut

Else→outside the print color gamut

Upon determining in step S303 that the pixel value exists in the print color gamut, the process advances to step S304. On the other hand, upon determining in step S303 that the pixel value does not exist in the print color gamut, the process advances to step S306.

In step S304, the CPU 101 determines whether determination of all pixels in the partial page is ended. Upon determining that determination of all pixels is ended, the process advances to step S305. On the other hand, upon determining that determination of all pixels is not ended, the process returns to step S302 to perform the above-described processing for the next pixel in the partial page.

In step S305, the CPU 101 sets a "colorimetric" mapping table as the mapping table of the partial page and ends the processing. Setting of the "colorimetric" mapping table will be described later with reference to FIG. 4. A case where the process of step S305 is performed is a state in which all pixels in the partial page exist in the print color gamut. It can therefore be considered that lowering of a color difference, which may occur when the "colorimetric" mapping table is used for a digital original formed by a plurality of colors outside the reproduction color gamut of the printer does not occur for the partial page. Hence, in this embodiment, if the process advances to step S305, a "colorimetric" mapping table is set.

On the other hand, in step S306, the CPU 101 sets a "perceptual" mapping table as the mapping table of the partial page and ends the processing. Setting of the "perceptual" mapping table will be described later with reference to FIG. 4. A case where the process of step S306 is performed is a state in which a pixel outside the print color gamut exists among the pixels in the partial page. It can therefore be considered that lowering of a color difference, which may occur when the "colorimetric" mapping table is used for a digital original formed by a plurality of colors outside the reproduction color gamut of the printer may occur for the partial page as well. Hence, in this embodiment, if the process advances to step S306, a "perceptual" mapping table is set.

After steps S305 or S306, the processing shown in FIG. 3 is ended.

Figure 4A:
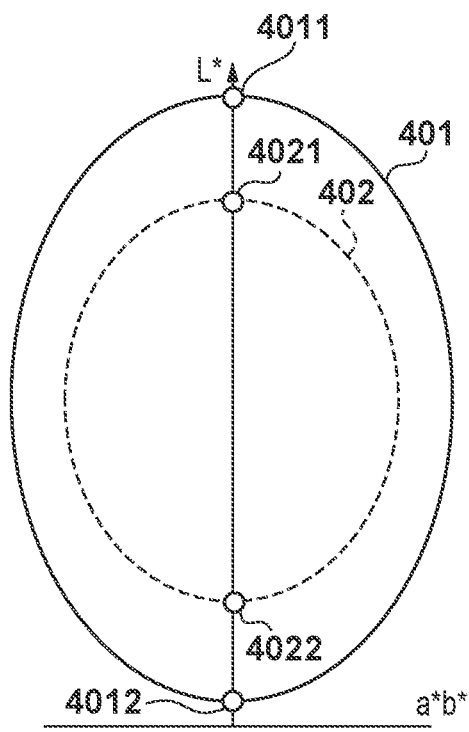
FIGS. 4A to 4D are views for explaining mapping tables.

FIGS. 4A to 4D are views for explaining the mapping tables set in steps S305 and S306 of FIG. 3. FIG. 4A is a view showing the relationship between the color space of a standard display and the color space of the MFP 10. That is, a solid line 401 in FIG. 4A indicates an sRGB color space defined as IEC 61966-2-1:1999 in the L*a*b* uniform color space. This is a color space that can be taken as the original data from the host PC 20. A broken line 402 in FIG. 4A indicates the color reproduction range of the MFP main body 10.

When outputting a color displayed on the standard display by the printing apparatus, a color outside the color reproduction range of the printing apparatus needs to be associated with an appropriate color in the reproduction range. This is generally called color space compression (color mapping). In general, a plurality of color space compression methods exist, and these are selectively used in accordance with the purpose. In FIG. 4A, a WP 4011 and a WP 4021 indicate the brightest colors (white points) in the reproduction range of the standard display and the MFP 10, respectively. Also, a BP 4012 and a BP 4022 indicate the darkest colors (black points) in the reproduction range of the standard display and the MFP 10, respectively.

Figure 4B:
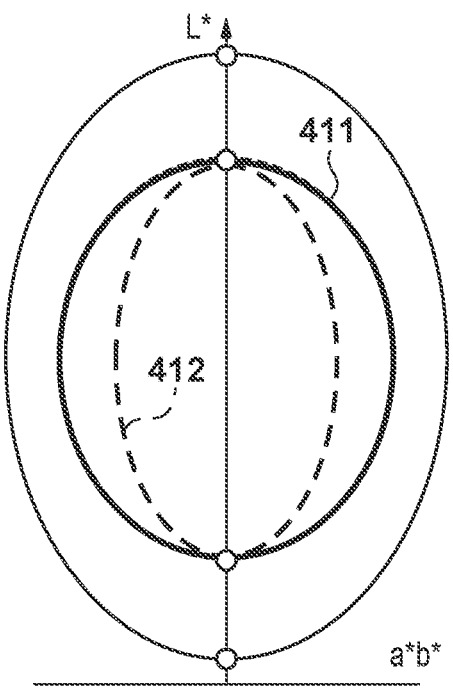

FIG. 4B is a view for explaining "perceptual" mapping. As indicated by a thick solid line portion 411 in FIG. 4B, the white points and the black points on the standard display are mapped to the white points and the black points on the MFP 10, respectively. The remaining colors are converted such that the correlation relationship with the white points and the black points is maintained. The conversion is performed by compressing the chroma on the color direction such that the whole color space 401 of the standard display is fitted in the print color gamut 402 of the MFP main body 10. Hence, colors on the color space 401 of the standard display are converted to the thick line 411, and colors on the original print color gamut 402 are converted to a thick broken line 412. The "perceptual" mapping shown in FIG. 4B is suitable for processing of image data such as a photo containing a lot of colors. In FIG. 4B, compression is performed for both lightness and chroma almost on the whole color gamut of the standard display.

Figure 4C:
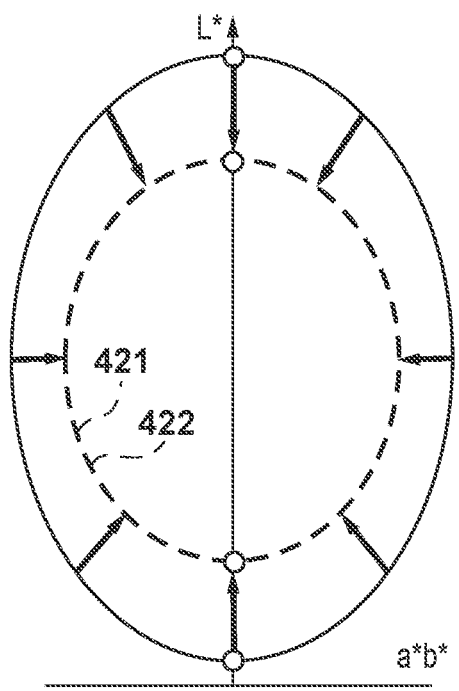

FIG. 4C is a view for explaining "absolute colorimetric" mapping. This is a method of performing compression not for colors in the print color gamut of the MFP 10 but colors outside the print color gamut concerning both lightness and chroma, as shown in FIG. 4C. Thick arrows in FIG. 4C represent compression processing. A plurality of colors included in the thick arrows are expressed as different colors on the standard display but are the same colors at the ends of the arrows after the mapping.

Figure 4D:
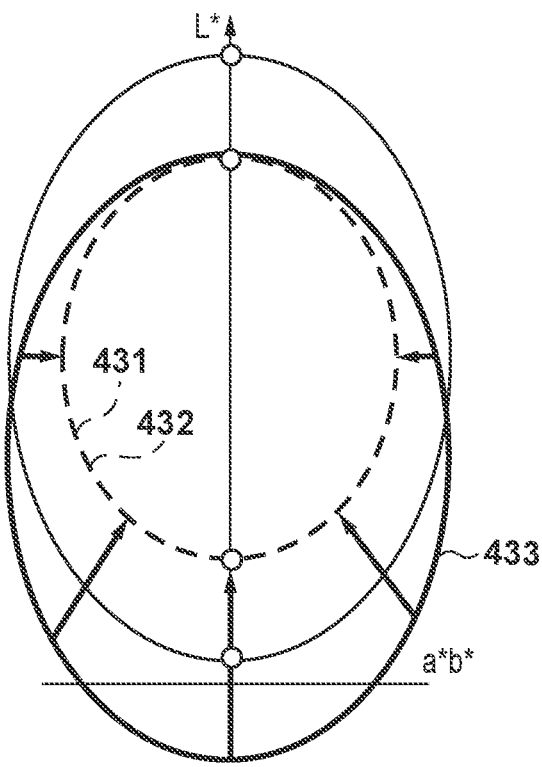

FIG. 4D is a view for explaining "relative colorimetric" mapping. This is a method of mapping only the white point on the standard display to the white point on the MFP 10, and after that, performing compression not for colors in the print color gamut of the MFP main body 10 but for colors outside the print color gamut concerning both lightness and chroma, as shown in FIG. 4D. This aims to reproduce the relative color difference between white color and each color in the standard display as the relative color difference between paper white and each color at the time of printing, and is called "relative colorimetric". Even in this mapping, a plurality of colors included in the thick arrows are expressed as different colors on the standard display but are the same colors at the ends of the arrows after the mapping.

There is also a method of mapping the white point and the black point on the standard display to the white point and the black point on the MFP 10, respectively, and after that, performing not compression for colors in the print color gamut of the MFP 10 but chroma compression for colors outside the print color gamut. As the "colorimetric" mapping set in step S305 of FIG. 3, "absolute colorimetric" mapping described with reference to FIG. 4C, "relative colorimetric" mapping described with reference to FIG. 4D, or another method described above may be used. Here, in a case where the "relative colorimetric" mapping or another method described above is used, if it is to be determined in step S303 whether a pixel value exists in the print color gamut, mapping to the white point and the black point need to be performed first. More specifically, in the case shown in FIG. 4D where mapping of only the white point is performed, if the L value of the white point in the print color gamut of the MFP 10 is defined as Lmax (the range of L is 0 to 100), determination is performed as indicated by the following equation.

$$Lin2 = Lin - (100 - Lmax)$$

If (Cin<=Cmax_Table[Lin2][Hin])→in the print color gamut
Else→outside the print color gamut In a case where mapping of both the white point and the black point is performed, if the L value of the white point in the print color gamut of the MFP 10 is defined as Lmax (the range of L is 0 to 100), and the K value of the black point is defined as Lmin, determination is performed as indicated by the following equation.

$$Lin2 = (Lmax - Lmin) * Lin/100 + Lmin$$

If (Cin<=Cmax_Table[Lin2][Hin])→in the print color gamut
Else→outside the print color gamut As described above, in this embodiment, it is possible to perform appropriate mapping for each partial page. That is, "perceptual" mapping is performed for a partial page including color information outside the print color gamut, and "colorimetric" mapping is performed for a partial page that does not include color information outside the print color gamut. With this configuration, mapping for reducing lowering of chroma can be performed for a digital original formed by colors that can be reproduced by the printer. In addition, mapping for reducing lowering of the color difference between colors can be performed for a digital original formed by a plurality of colors outside the reproduction color gamut of the printer. Also, color conversion in step S204 of FIG. 2 and print processing in step S205 need not always be performed at these timings, and may be performed after it is determined in step S206 that analysis of all partial pages is ended.

When performing color conversion processing and print processing at the timings of steps S204 and S205 in FIG. 2, a mapping table for a partial page of interest need not be held from then on. Hence, the consumption amount of the RAM 102 for holding the mapping table may be reduced by deleting the mapping table. On the other hand, when performing color conversion processing and print processing at timings after step S206, printing is started after completion of analysis processing of all partial pages. It is therefore possible to print without making the user feel a print delay caused by analysis processing. For example, such a configuration may be employed by a system that performs printing after the data of all partial pages are spooled.

In the above description, each page of original data is set as a partial page. A modification of this embodiment will be described below. A phenomenon may occur in which even if pixel values (RGB values) are identical between a first partial page and a second partial page, the values are output as different colors between the partial pages. A modification for reducing visual influence in the above-described phenomenon will be described below.

A human visual sense has a characteristic that the difference between two colors that are spatially adjacent or exist in very close places can easily be relatively perceived, but the difference between two colors that exist in places spatially far apart can hardly be relatively perceived. That is, the result of "output as different colors" can readily be perceived if the processing is performed for identical colors that are spatially adjacent or exist in very close places, but can hardly be perceived if the processing is performed for identical colors that exist in places spatially far apart.

Hence, in this modification, for a print job of a plurality of pages, partial pages are set as shown in Table 1.

TABLE 1

| Printing method | Page allocation | page1 | page2 | page3 | page4 |
|---|---|---|---|---|---|
| Single-sided printing | print surface | obverse surface of first sheet | obverse surface of second sheet | obverse surface of third sheet | obverse surface of fourth sheet |
| | partial page number | first partial page | second partial page | third partial page | fourth partial page |
| Double-sided printing | print surface | obverse surface of first sheet | reverse surface of first sheet | obverse surface of second sheet | reverse surface of second sheet |
| | partial page number | first partial page | second partial page | | third partial page |

In this modification, a print job of four pages will be described as an example. In single-sided printing, since it is assumed that all pages are independently referred to, all pages are set as four individual partial pages. On the other hand, in double-sided printing, the print job of four pages is set as a total of three partial pages.

Figure 5A:
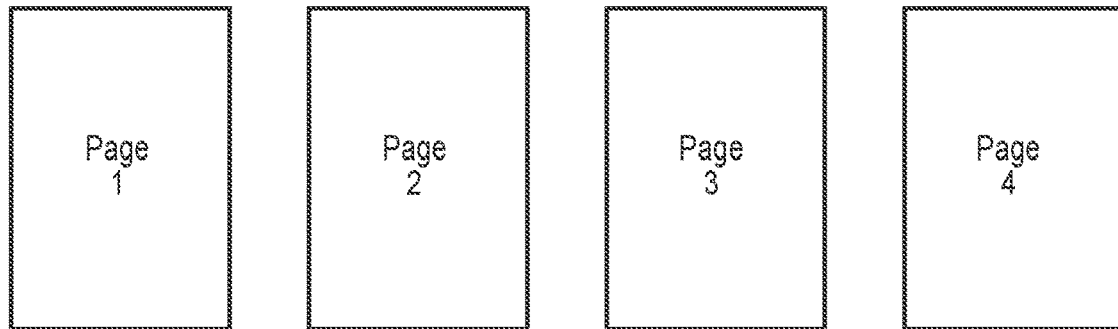
FIGS. 5A and 5B are views showing the images of print surface allocation.
Figure 5B:
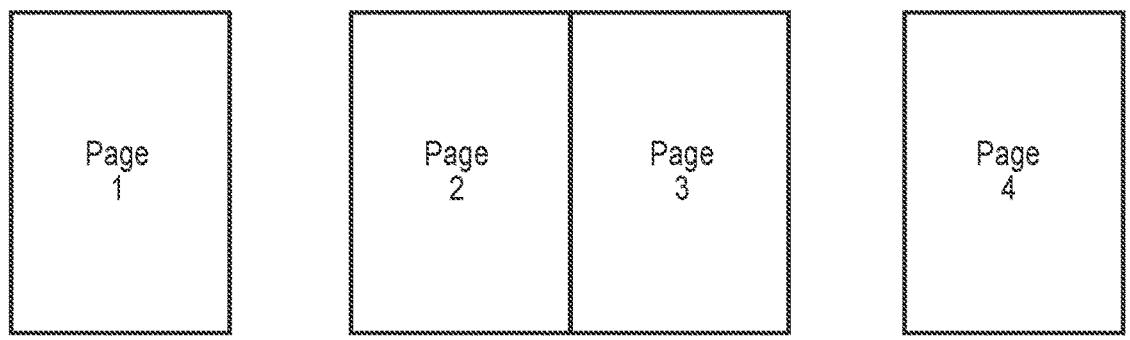

FIGS. 5A and 5B are views showing the images of print surface allocation in the printing methods. FIG. 5A shows the image of print surface allocation in single-sided printing shown in Table 1. FIG. 5B shows the image of print surface allocation in double-sided printing shown in Table 1.

As shown in FIGS. 5A and 5B, in double-sided printing, Page2 and Page3 are adjacent. This indicates that if the printed document is closed after double-sided printing, Page2 and Page3 are printed on the reverse surface of the first sheet and the obverse surface of the second sheet, and the possibility that these are viewed at adjacent positions is relatively high. On the other hand, if the printed document is closed after single-sided printing, each page is printed on the obverse surface of the corresponding sheet, and the possibility that these are viewed at adjacent positions is relatively low. Hence, in double-sided printing, it is preferable to set Page2 and Page3 to the same partial page and perform the same mapping.

Figure 6:
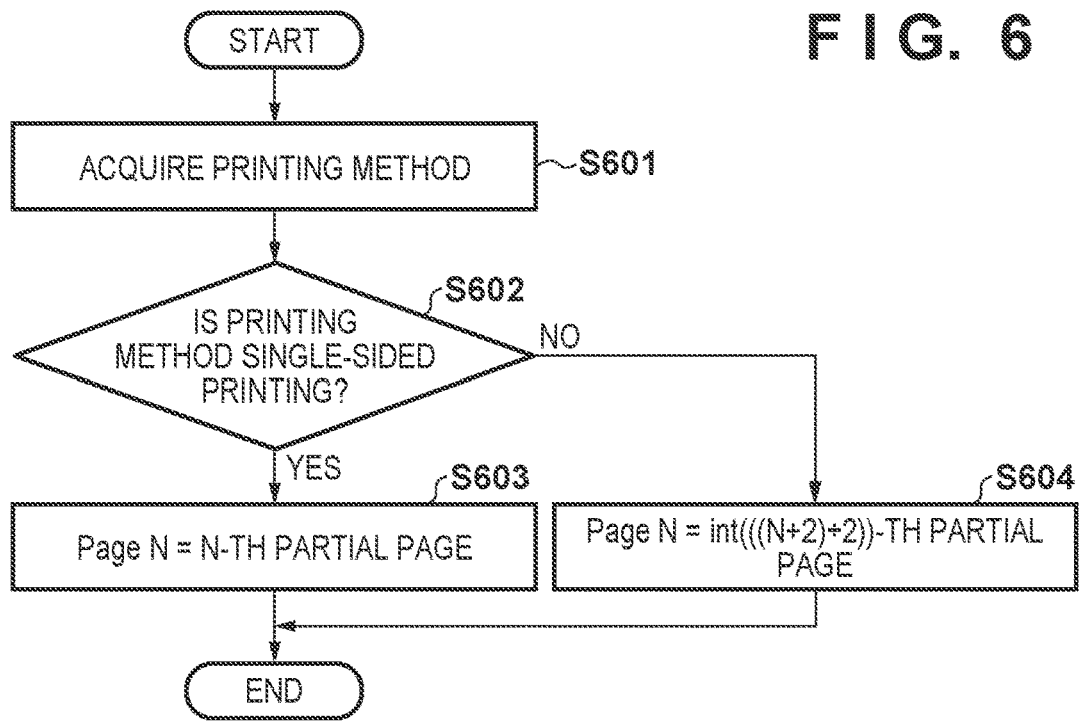
FIG. 6 is a flowchart showing control processing according to a print mode.

FIG. 6 is a flowchart showing control processing according to a print mode in this modification. Processing shown in FIG. 6 is implemented by, for example, the CPU 101 reading out a program stored in the ROM 103 and executing.

In step S601, the CPU 101 acquires the information of a printing method (print mode) from a print job. In this modification, information representing whether to perform single-sided printing or double-sided printing is acquired. The printing method is set by the user on, for example, the host PC 20, and the set information is included in the print job.

In step S602, the CPU 101 determines whether the information of the printing method acquired in step S601 indicates single-sided printing. Upon determining that the information indicates single-sided printing, the process advances to step S603. On the other hand, upon determining that the information does not indicate single-sided printing, that is, indicates double-sided printing, the process advances to step S604.

In step S603, the CPU 101 sets which partial page includes each page of the original data in single-sided printing. In single-sided printing, as described above, all print pages are set as separate partial pages. Hence, an Nth page is set as an Nth partial page. Based on this rule, the CPU 101 sets partial page numbers to the first to final pages. After step S603, the processing shown in FIG. 6 is ended.

On the other hand, in step S604, the CPU 101 sets which partial page includes each page of the original data in double-sided printing. In double-sided printing, as described above, all print pages that should be viewed together as a double-page spread are set together as one partial page. Hence, an Nth page is set as an int(((N+2)÷2))th partial page.

Based on this rule, the CPU 101 sets partial page numbers to the first to final pages. After step S604, the processing shown in FIG. 6 is ended. Here, int(A) processing means processing of extracting only an integer part of a portion A and truncating a fractional part. For example, in original data of 10 pages, the first page is set to the first partial page, the second and third pages are set to the second partial page, and the fourth and fifth pages are set to the third partial page. Furthermore, the sixth and seventh pages are set to the fourth partial page, the eighth and ninth pages are set to the fifth partial page, and the 10th page is set to the sixth partial page.

As described above, the partial pages for which mapping is individually performed can appropriately be set in accordance with the print form. That is, one of "perceptual" mapping and "colorimetric" mapping is set for each partial page. With this configuration, mapping for reducing lowering of chroma can be performed for a digital original formed by colors that can be reproduced by the printer. In addition, mapping for reducing lowering of the color difference between colors can be performed for a digital original formed by a plurality of colors outside the reproduction color gamut of the printer. Also, it is possible to reduce visual influence in a phenomenon that occurs at this time, in which identical pixel values (RGB values) are output as different colors between partial pages.

Second Embodiment

The second embodiment will be described below concerning points different from the first embodiment. In the first embodiment, "perceptual" mapping table and "colorimetric" mapping table are switched on a partial page basis depending on whether a color outside the print color gamut exists. With this configuration, mapping for reducing lowering of chroma can be performed for a digital original formed by colors that can be reproduced by a printer, as described above. In addition, mapping for reducing lowering of the color difference between colors can be performed for a digital original formed by a plurality of colors outside the reproduction color gamut of a printer, as described above.

In this embodiment, assume original data in which "the number of colors outside the color gamut is very small, for example, only one color exists, and lowering of the color difference between colors does not occur". If "perceptual" mapping, that is, mapping for reducing lowering of the color difference is performed for such original data, lowering of chroma is assumed to be more conspicuous than lowering of the color difference in the output result. In this embodiment, a configuration for implementing reduction of lowering of chroma in original data as described above will be described.

Figure 7:
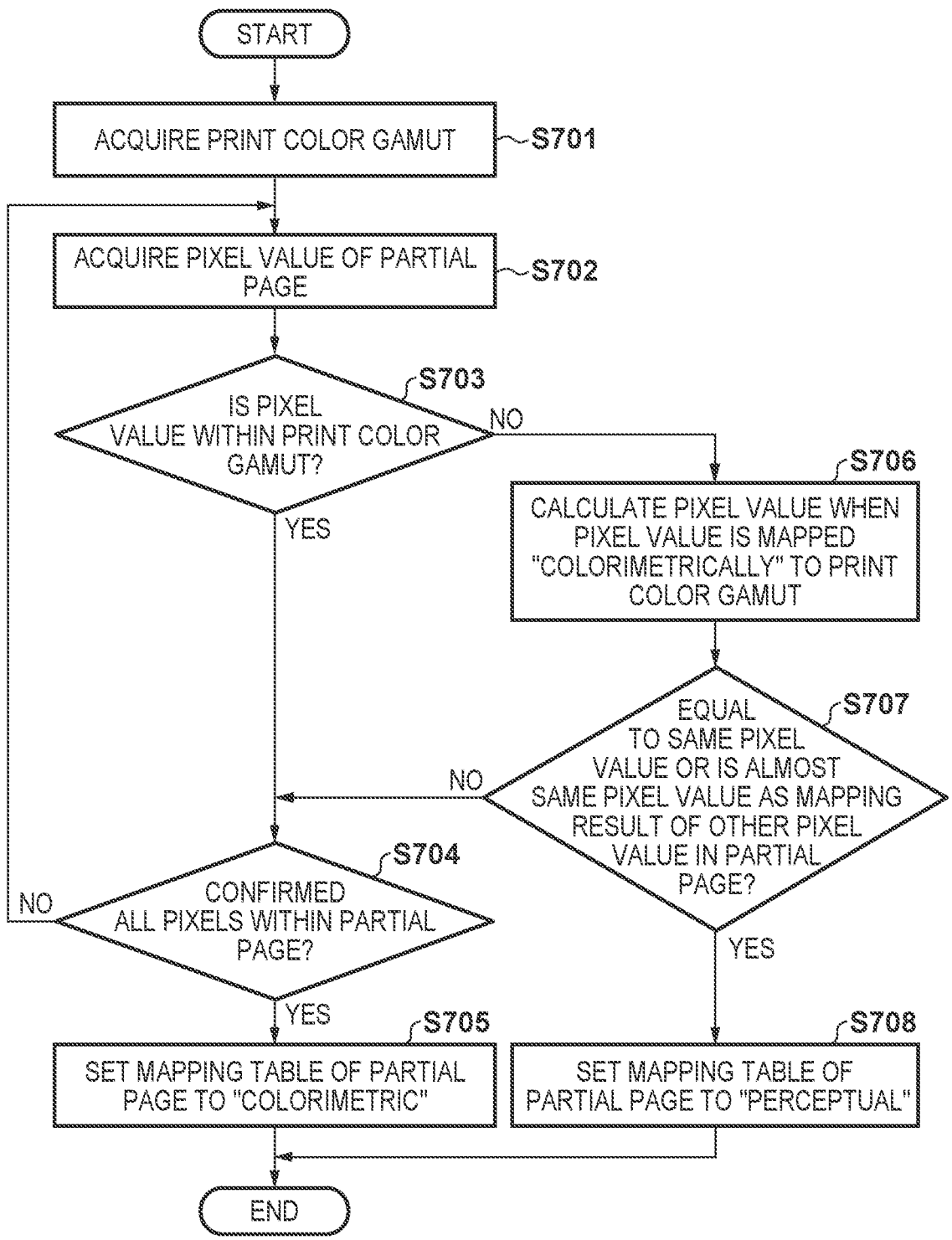
FIG. 7 is a flowchart showing mapping table creation processing in step S203.

FIG. 7 is a flowchart showing mapping table creation processing in step S203 in this embodiment. Steps S701 to S705 in FIG. 7 are the same as steps S301 to S305 in FIG. 3, and a description thereof will be omitted.

In this embodiment, if it is determined in step S703 that a pixel value does not exist in the print color gamut, the process advances to step S706. In step S706, a CPU 101 calculates a pixel value in a case where "colorimetric" mapping of the pixel value in the print color gamut is performed. Here, the "colorimetric" mapping is a mapping method described with reference to FIGS. 4C and 4D. The pixel value when this mapping is performed means "the pixel value at the end of a thick arrow" in FIGS. 4C and 4D. More specifically, in mapping in which the compression center is set to L=Ltarget, and C=0, the CPU 101 calculates Lin, Cin, and Hin by the following equations. Here, Ltarget is, for example, "50" in FIGS. 4C and 4D.

$Lin=sRGBtoLCH[Rin][Gin][Bin][0]$ $Cin=sRGBtoLCH[Rin][Gin][Bin][1]$ $Hin=sRGBtoLCH[Rin][Gin][Bin][2]$

A value obtained by converting lightness Lmap, chroma Cmap, and hue Hin, which are obtained as the result of calculation using the maximum value of X satisfying the following equations, into L*, a*, and b* is the pixel value.

$Cmap=Cin*X\%$ $Lmap=Ltarget+(Lin-Ltarget)*X\%$ $Cmap<=Cmax\_Table[Lmap][Hin]$

Next, in step S707, the CPU 101 determines whether (i) the pixel value calculated in step S706 equals to the same pixel value or is almost the same pixel value as the mapping result of another pixel value in the partial page, or (ii) the pixel value calculated in step S706 does not equal to the same pixel value and is not almost the same pixel value as the mapping result of another pixel value in the partial page. Here, another pixel value is another pixel value determined to be a pixel outside the print color gamut in step S703, and, for example, it is determined whether the difference from another pixel value falls within a predetermined range. Upon determining in step S707 that the pixel value equals to the same pixel value or is almost the same pixel value as the mapping result of another pixel value, the process advances to step S708. On the other hand, upon determining that the pixel value does not equal to the same pixel value and is not almost the same pixel value as the mapping result of another pixel value, the process advances to step S704. Note that if it is determined in step S703 that the pixel value does not exist in the print color gamut, for the first time from the start of the processing shown in FIG. 7, "another pixel value" in the determination of step S707 does not exist. In this case, the process advances from step S707 to step S704.

In other words, the determination of step S707 represents determining whether "a plurality of pixel values on the thick arrows in FIGS. 4C and 4D exist". That is, the determination represents whether "lowering of the color difference between colors occurs for a digital original formed by a plurality of colors outside the reproduction color gamut of the printer".

The determination of step S707 places emphasis not on whether the pixel value after mapping completely matches but on whether the pixel value after mapping cannot be distinguished by a human eye. Hence, the determination of step S707 may be performed based on whether, for example, the color difference $\Delta E=((L1-L2)^2+(a1-a2)^2+(b1-b2)^2)^{(1/2)}$ between two pixel values (L1, a1, b1) and (L2, a2, b2) is a predetermined value or less. Since it is generally said that the range in which colors can clearly be recognized as different colors by the human eye is approximately $0.8<\Delta E$ between adjacent colors or $1.6<\Delta E$ between separate colors, the determination of step S707 may be performed under the condition of $\Delta E<1.6$.

In addition, based on the idea that two colors whose color difference is originally small may have a small color difference even after mapping, "another pixel value" in the determination of step S707 may be changed to "a pixel value that satisfies $\Delta E>1.6$ with respect to the pixel". According to this configuration, lowering of the color difference can be determined more strictly.

Upon determining in step S707 that the pixel value equals to the same pixel value or is almost the same pixel value as the mapping result of another pixel value, it can be said that "lowering of the color difference between colors, which may occur for a digital original formed by a plurality of colors outside the reproduction color gamut of the printer" occurs. Hence, a "perceptual" mapping table is set as the mapping table of the partial page. As a result, "lowering of the color difference" can be reduced. On the other hand, upon determining that the pixel value does not equal to the same pixel value and is not almost the same pixel value as the mapping result of another pixel value, lowering of the color difference does not occur even if a color outside the reproduction color gamut of the printer exists. In this case, a "colorimetric" mapping table is set as the mapping table of the partial page. As a result, lowering of chroma caused by setting of the "perceptual" mapping table can be reduced.

As described above, according to this embodiment, it is determined whether the original data is data in which lowering of the color difference between colors never occurs, and the mapping method is set based on the result. With this configuration, it is possible to more appropriately set the mapping method.

Third Embodiment

The third embodiment will be described below concerning points different from the first and second embodiments. In the first and second embodiments, mapping is performed using "perceptual" and "colorimetric" mapping tables that are created in advance, as described above. In this embodiment, assume a case where a first partial page in which pixel data values exist outside the print color gamut by a very small amount of chroma/lightness and a second partial page in which pixel data values exist outside the print color gamut by a very large amount of chroma/lightness coexist. In this case, if the same "perceptual" mapping table is set for both the first partial page and the second partial page, a phenomenon that the influence of lowering of chroma is larger in the first partial page is assumed to occur.

Hence, in this embodiment, a configuration for setting, for each partial page, a mapping method suitable for the partial page depending on how many pixel data values are distributed in a color gamut wider than the print color gamut will be described.

Figure 8:
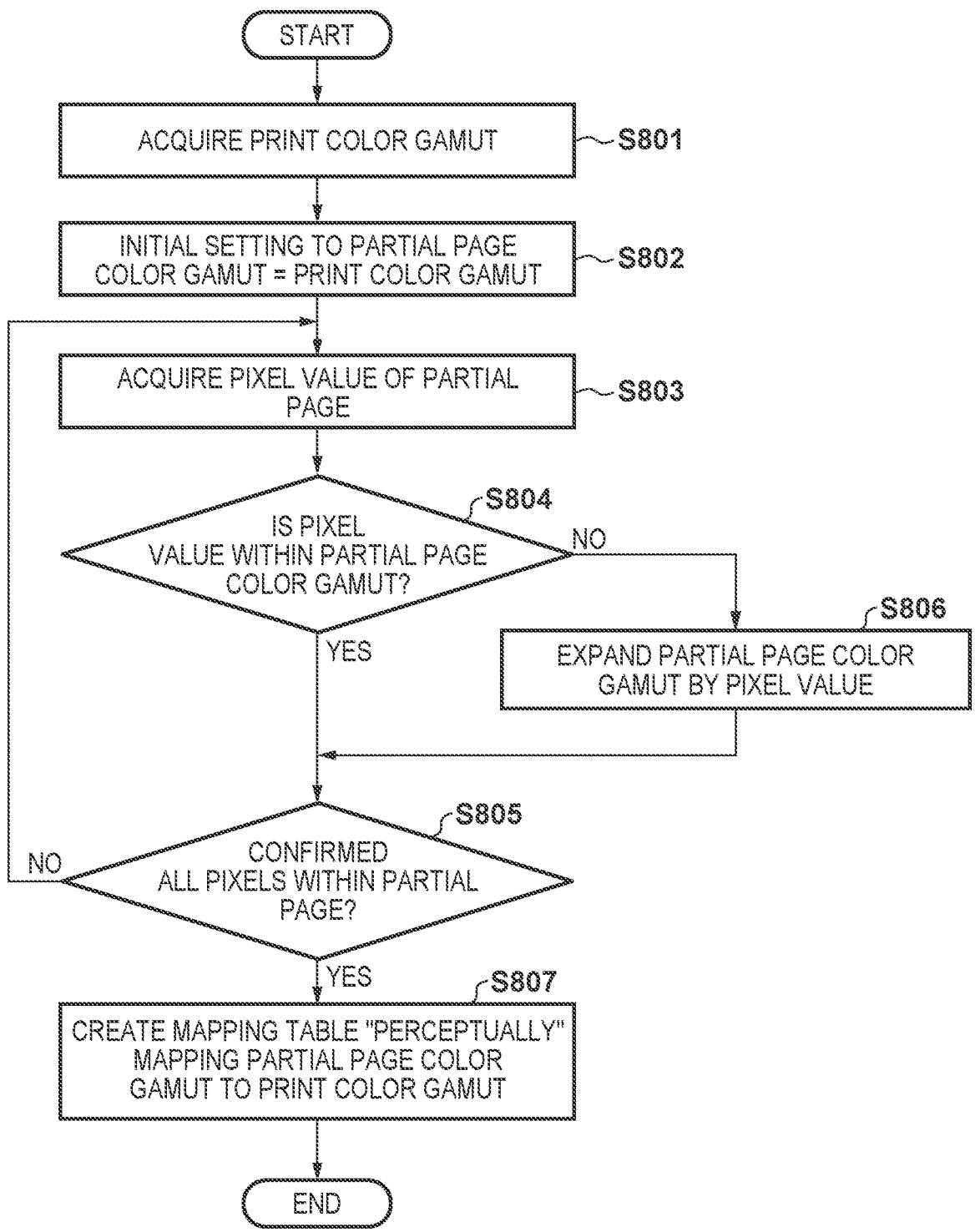
FIG. 8 is a flowchart showing mapping table creation processing in step S203.

FIG. 8 is a flowchart showing mapping table creation processing in step S203 according to this embodiment. In step S801, a CPU 101 acquires a print color gamut that can be reproduced in printing of an MFP 10. In step S802, as the output gamut in the partial page, the print color gamut acquired in step S801 is set. In other words, as the default of the output gamut in the partial page, the print color gamut acquired in step S801 is set. More specifically, copy of a table value Cmax_Page_Table[Lin][Hin]=Cmax_Table[Lin][Hin] is performed within the range of L from 0 to 100 and the range of Hin of 0 to 360.

Steps S803 to S805 form loop processing to be executed for each pixel in a partial page.

In step S803, the CPU 101 acquires the pixel value of one pixel in the partial page. In step S804, the CPU 101 determines whether the pixel value acquired in step S803 exists in the color gamut of the partial page set in step S802. More specifically, the CPU 101 calculates Lin, Cin, and Hin by the following equations.

$Lin=sRGBtoLCH[Rin][Gin][Bin][0]$ $Cin=sRGBtoLCH[Rin][Gin][Bin][1]$ $Hin=sRGBtoLCH[Rin][Gin][Bin][2]$

The CPU 101 performs comparison processing as shown by the following equations, thereby determining whether the pixel value exists in the color gamut of the partial page.

If (Cin<=Cmax_Page_Table[Lin][Hin])→in the color gamut of the partial page

Else→outside the color gamut of the partial page

Upon determining in step S804 that the pixel value exists within the color gamut of the partial page, the process advances to step S805. On the other hand, upon determining in step S804 that the pixel value does not exist within the color gamut of the partial page, the process advances to step S806.

In step S805, the CPU 101 determines whether determination of all pixels in the partial page is ended. Upon determining that determination of all pixels is ended, the process advances to step S807. On the other hand, upon determining that determination of all pixels is not ended, the process returns to step S803 to perform the above-described processing for the next pixel in the partial page.

In step S806, the CPU 101 expands the color gamut of the partial page by the pixel determined not to exist in the color gamut of the partial page. More specifically, since it is determined that Cin>Cmax_Page_Table[Lin][Hin], the CPU 101 sets Cmax_Page_Table[Lin][Hin]=Cin. If expansion of the color gamut of the partial page is performed in step S806, the process advances to step S805.

In step S807, the CPU 101 creates a mapping table to perceptually map the color gamut of the partial page to the print color gamut. After that, the processing shown in FIG. 8 is ended.

As described above, in this embodiment, a mapping table suitable for the color distribution of each partial page can be created.

Figure 9A:
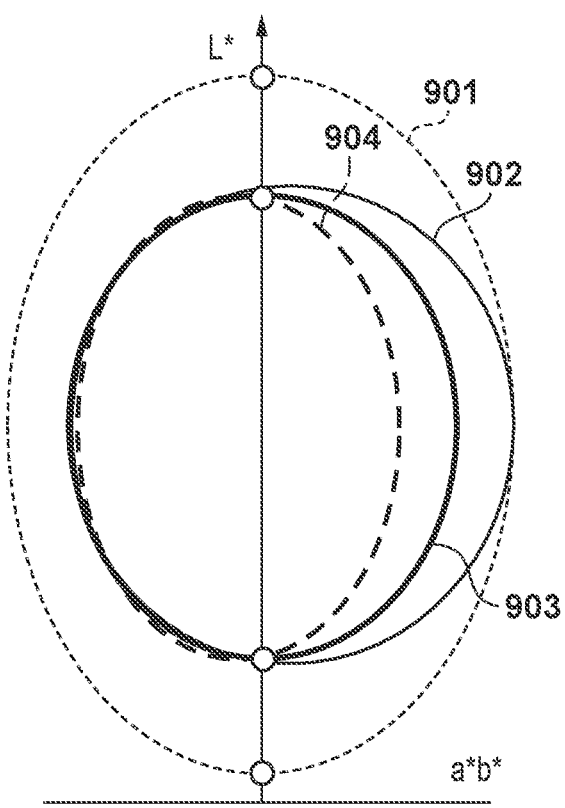
FIGS. 9A and 9B are views for explaining mapping on a partial page basis.
Figure 9B:
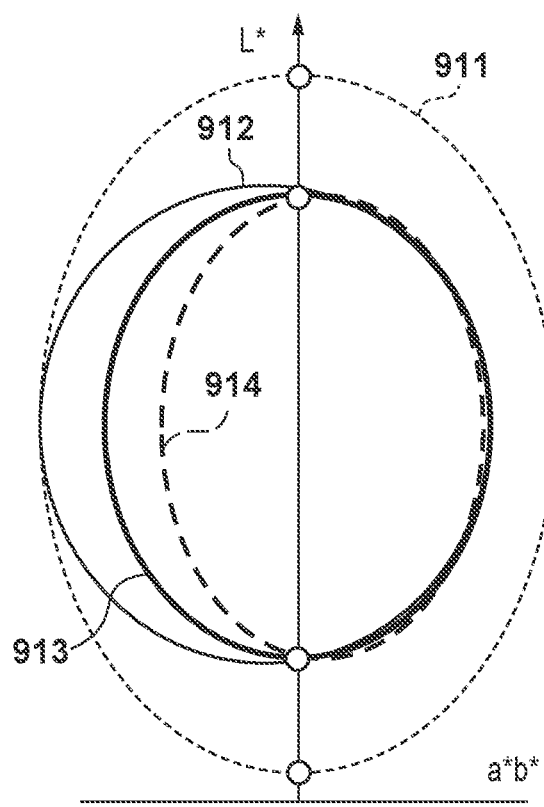

FIGS. 9A and 9B are views for explaining examples of color gamut distributions on a partial page basis and examples of mapping for these in this embodiment.

FIG. 9A shows an example in which for the print color gamut, many colors on the right side in the drawing concerning a*b* (in this embodiment, a* is the +direction and is the red direction) are included in a partial page. A dotted line 901 indicates the color gamut of a standard display, a solid line 902 indicates the color gamut of the partial page, and a thick line 903 indicates a print color gamut. Colors on the solid line 902 that is the color gamut of the partial page are colors of the mapping target. Also, a thick broken line 904 indicates colors in a case where colors on the thick line 903 indicating the print color gamut are perceptually mapped.

On the other hand, FIG. 9B shows an example in which for the print color gamut, many colors on the left side in the drawing concerning a*b* (in this embodiment, a* is the −direction and is the green direction) are included in a partial page. A dotted line 911 indicates the color gamut of a standard display, a solid line 912 indicates the color gamut of the partial page, and a thick line 913 indicates a print color gamut. Colors on the solid line 912 that is the color gamut of the partial page are colors of the mapping target. Also, a thick broken line 914 indicates colors in a case where colors on the thick line 913 indicating the print color gamut are mapped.

In FIG. 9A, in the area on the green side that is the left side in the drawing, the color gamut of the partial page is almost held in the print color gamut. On the other hand, in the red area on the right side in the drawing, the mapping table is perceptually set such that a plurality of colors do not change to identical colors. In FIG. 9B, in the area on the red side that is the right side in the drawing, the color gamut of the partial page is almost held in the print color gamut. On the other hand, in the green area on the left side in the drawing, the mapping table is perceptually set such that a plurality of colors do not change to identical colors.

As described above, according to this embodiment, it is possible to analyze, for each partial page, how many pixel data values of the partial page are distributed in a color gamut wider than the print color gamut and set a mapping method suitable for each partial page in accordance with the distribution.

When expanding the color gamut of the partial page in step S806 of FIG. 8, the maximum chroma in the lightness and hue of the pixel value is updated, as described above. However, if only the information for the one hue/one lightness is updated, the change of mapping becomes steep, and this may cause a steep change in the image after color conversion. Hence, to avoid the steep change, in step S806, the maximum chroma may be updated not only concerning the lightness and hue but also for the lightness and hue on the periphery. Also, when creating a mapping table in step S807, averaging processing may be performed between the value of the maximum chroma and the maximum chroma for the lightness and hue on the periphery. With this configuration, a smooth mapping table can be created.

Fourth Embodiment

The fourth embodiment will be described below concerning points different from the first to third embodiments. In the first to third embodiments, mapping is set by defining each page included in original data as a "partial page", as described above. Here, assume a case where in a very small portion of a page, pixel values outside the print color gamut exist, and a plurality of colors whose color difference is eliminated as the result of mapping exist. If "perceptual" mapping is performed in such a case, lowering of chroma in portions other than the above-described one portion is assumed to be conspicuous.

As described above, a human visual sense has a characteristic that the difference between two colors that are spatially adjacent or exist in very close places can easily be relatively perceived, but the difference between two colors that exist in places spatially far apart can hardly be relatively perceived. Hence, in this embodiment, a configuration will be described in which portions that are spatially far apart in the same page are set as separate areas (that is, separate "partial pages"), and mapping suitable for each area is set, thereby reducing both lowering of chroma and lowering of the color difference.

FIG. 10 is a flowchart showing mapping table creation processing in step S203 according to this embodiment. In step S1001, a CPU 101 acquires original data as a print target. In this embodiment, the original data is assumed to be document data of one page. If the original data is document data formed by a plurality of pages, the processing shown in FIG. 10 is repeated as many times as the number of pages. In step S1002, the CPU 101 divides the original data (one page) into a plurality of areas. Area division here will be described later.

Steps S1003 to S1006 form loop processing to be executed for each area.

In step S1003, the CPU 101 analyzes an area and creates an area mapping table. Area mapping table creation processing will be described later with reference to FIG. 15.

In step S1004, the CPU 101 performs color conversion of the area using the area mapping table created in step S1003. More specifically, the CPU 101 performs, using the following equations, color conversion for the pixels of an image formed by RGB pixel values in the area divided in step S1002.

$$Rout = Table1[Rin][Gin][Bin][0]$$

$$Gout = Table1[Rin][Gin][Bin][1]$$

$$Bout = Table1[Rin][Gin][Bin][2]$$

In step S1005, the CPU 101 determines whether analysis and color conversion of all areas in the original page are ended. Upon determining that analysis and color conversion of all areas are ended, the process advances to step S1006. On the other hand, upon determining that analysis and color conversion of all areas are not ended, the process returns to step S1003 to place focus on the next area and perform subsequent processing.

In step S1006, the CPU 101 performs printing of the original page. More specifically, four processes including ink color separation, output characteristic conversion, quantization, and printing are performed for each pixel of the converted image of the original page in which all areas are color-converted. Each process is the same as in step S205 of FIG. 2, and a description thereof will be omitted.

Thus, the processing of the original page is ended. Also, color conversion processing in step S1004 of FIG. 10 need not always be performed at this timing, and color conversion of all areas may be performed at a timing between steps S1005 and S1006 after analysis of all areas is ended in the original page. When performing color conversion processing at the timing of step S1004 in FIG. 10, a mapping table for an area of interest need not be held from then on. Hence, the consumption amount of a RAM 102 for holding the mapping table may be reduced by deleting the mapping table. On the other hand, when performing color conversion processing at a timing between steps S1005 and S1006, processing is performed while switching the mapping table for continuous areas. It is therefore possible to implement high-speed processing by hardware processing.

Figure 11:
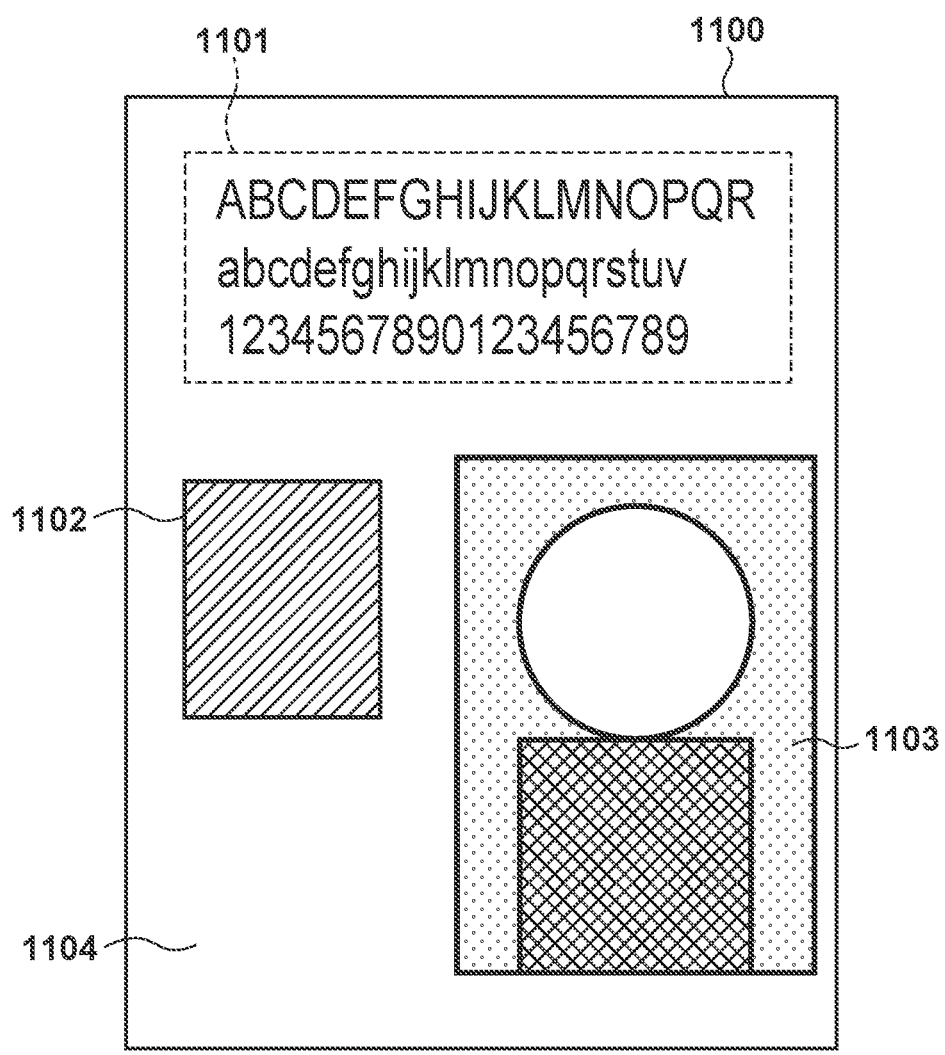
FIG. 11 is a view for explaining an original page.

FIG. 11 is a view for explaining an example of the original page acquired in step S1001 of FIG. 10 in this embodiment. Here, the document data is assumed to be described in PDL. PDL is a short for Page Description Language, and is formed by a set of drawing instructions on a page basis. The types of drawing instructions are defined for each PDL specification. In this embodiment, the following three types are used as an example.

Instruction 1) TEXT drawing instruction (X1, Y1, color, font information, character string information)
Instruction 2) BOX drawing instruction (X1, Y1, X2, Y2, color, paint shape)
Instruction 3) IMAGE drawing instruction (X1, Y1, X2, Y2, image file information)

In some cases, drawing instructions such as a DOT drawing instruction for drawing a dot, a LINE drawing instruction for drawing a line, and a CIRCLE drawing instruction for drawing a circle are used as needed in accordance with the application purpose. For example, a general PDL such as PDF (Portable Document Format) proposed by Adobe, XPS proposed by Microsoft, or HP-GL/2 proposed by HP may be used.

An original page 1100 in FIG. 11 represents one page of document data, and as an example, the number of pixels is 600 horizontal pixels×800 vertical pixels. An example of PDL corresponding to the document data of the original page 1100 in FIG. 11 is shown below.

<PAGE=001>
<TEXT>50,50,550,100,BLACK,STD-18,
 "ABCDEFGHIJKLMNOPQR"</TEXT>
<TEXT>50,100,550,150,BLACK,STD-18,
 "abcdefghijklmnopqrstuv"</TEXT>
<TEXT>50,150,550,200,BLACK,STD-18,
 "1234567890123456789"</TEXT>
<BOX>50,350,200,550,GRAY,STRIPE</BOX>
<IMAGE>250,300,580,700,"PORTRAIT.jpg"</IMAGE>
</PAGE>

<PAGE=001> of the first row is a tag representing the number of pages in this embodiment. Normally, since the PDL is designed to be able to describe a plurality of pages, a tag representing a page break is described in the PDL. In this example, the section up to </PAGE> represents the first page. In this embodiment, this corresponds to the original page 1100 in FIG. 11. If the second page exists, <PAGE=002> is described next to the above PDL.

The section from <TEXT> of the second row to </TEXT> of the third row is drawing instruction 1, and this corresponds to the first row of an area 1101 in FIG. 11. The first two coordinates represent the coordinates (X1, Y1) at the upper left corner of the drawing area, and the following two coordinates represent the coordinates (X2, Y2) at the lower right corner of the drawing area. The subsequent description shows that the color is BLACK (black: R=0, G=0, B=0), the character font is "STD"(standard), the character size is 18 points, and the character string to be described is "ABCDEFGHIJKLMNOPQR".

The section from <TEXT> of the fourth row to </TEXT> of the fifth row is drawing instruction 2, and this corresponds to the second row of the area 1101 in FIG. 11. The first four coordinates and two character strings represent the drawing area, the character color, and the character font, like drawing instruction 1, and it is described that the character string to be described is "abcdefghijklmnopqrstuv".

The section from <TEXT> of the sixth row to </TEXT> of the seventh row is drawing instruction 3, and this corresponds to the third row of the area 1101 in FIG. 11. The first four coordinates and two character strings represent the drawing area, the character color, and the character font, like drawing instruction 1 and drawing instruction 2, and it is described that the character string to be described is "1234567890123456789".

The section from <BOX> to </BOX> of the eighth row is drawing instruction 4, and this corresponds to an area 1102 in FIG. 11. The first two coordinates represent the upper left coordinates (X1, Y1) at the drawing start point, and the following two coordinates represent the lower right coordinates (X2, Y2) at the drawing end point. Next, the color is GRAY (gray: R=128, G=128, B=128), and STRIPE (stripe pattern) is designated as the paint shape. In this embodiment, as for the direction of the stripe pattern, lines in the forward diagonal direction are used. The angle or period of lines may be designated in the BOX instruction.

Next, the IMAGE instruction of the ninth and 10th rows corresponds to an area 1103 in FIG. 11. Here, it is described that the file name of the image existing in the area is "PORTRAIT.jpg". This indicates that the file is a JPEG file that is a popular image compression format. Then, </PAGE> described in the 11th row indicates that the drawing of the page ends.

There is a case where an actual PDL file integrates "STD" font data and a "PORTRAIT.jpg" image file in addition to the above-described drawing instruction group. This is because if the font data and the image file are separately managed, the character portion and the image portion cannot be formed only by the drawing instructions, and information needed to form the image shown in FIG. 11 is insufficient. Also, an area 1104 in FIG. 11 is an area where no drawing instruction exists, and is blank.

In an original page described in PDL, like the original page 1100 shown in FIG. 11, area division in step S1002 of FIG. 10 can be implemented by analyzing the PDL. More specifically, in the drawing instructions, the start points and the end points of the drawing y-coordinates are as follows, and these continue from the viewpoint of areas.

| Drawing instruction | Y start point | Y end point |
| --- | --- | --- |
| First TEXT instruction | 50 | 100 |
| Second TEXT instruction | 100 | 150 |
| Third TEXT instruction | 150 | 200 |
| BOX instruction | 350 | 550 |
| IMAGE instruction | 300 | 700 |

In addition, it is found that both the BOX instruction and the IMAGE instruction are apart from the TEXT instructions by 100 pixels in the Y direction.

Next, in the BOX instruction and the IMAGE instruction, the start points and the end points of the drawing x-coordinates are as follows, and it is found that these are apart by 50 pixels in the X direction.

| Drawing instruction | X start point | X end point |
| --- | --- | --- |
| BOX instruction | 50 | 200 |
| IMAGE instruction | 250 | 580 |

Thus, three areas can be set as follows.

| Areas | X start point | Y start point | X end point | Y end point |
| --- | --- | --- | --- | --- |
| First area | 50 | 50 | 550 | 200 |
| Second area | 50 | 350 | 200 | 550 |
| Third area | 250 | 300 | 580 | 700 |

Not only the configuration for thus analyzing PDL and performing area division but also a configuration for performing area division using a drawing result may be employed. The configuration will be described below.

Figure 12:
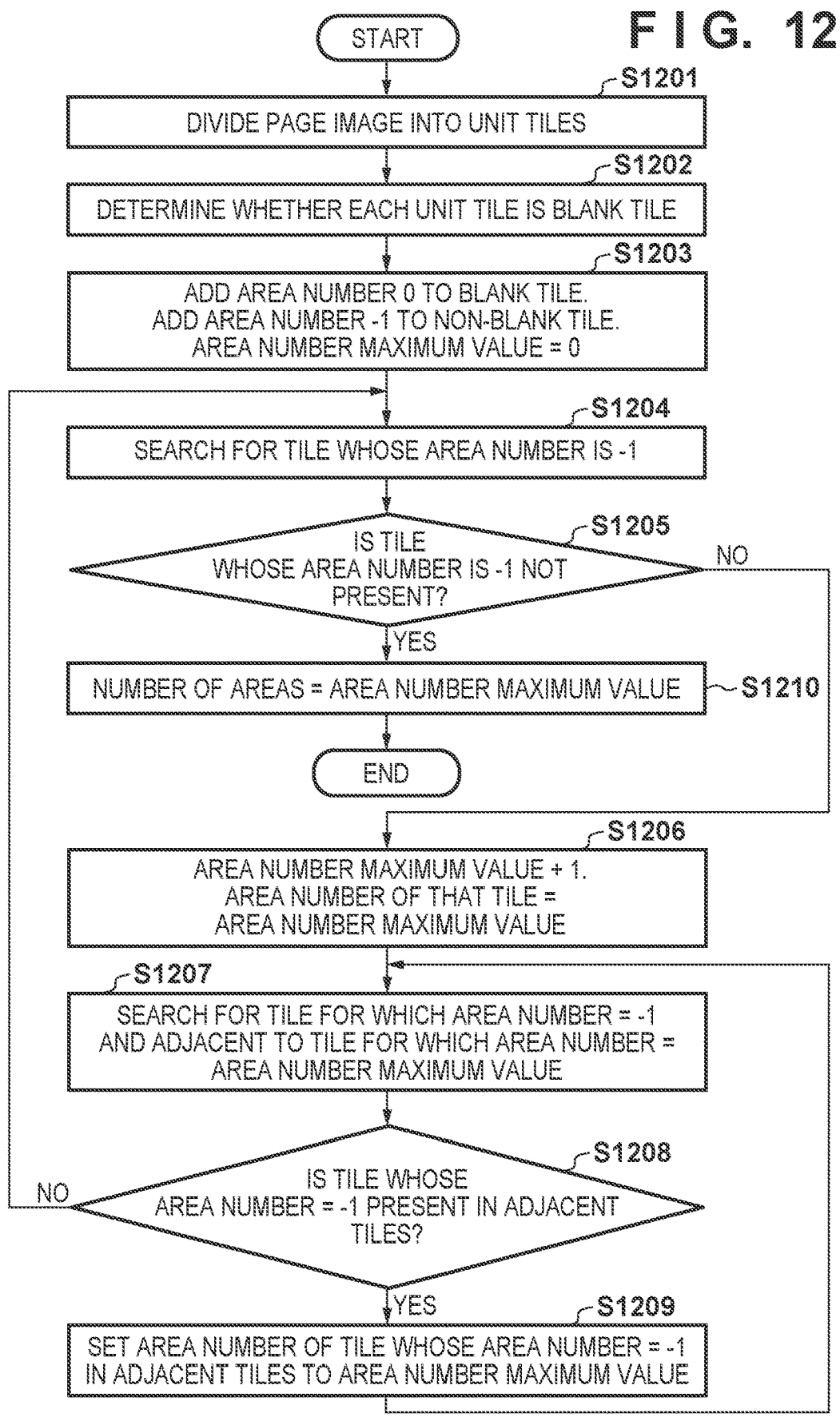
FIG. 12 is a flowchart showing processing of performing area division on a tile basis.

FIG. 12 is a flowchart showing processing of performing area division in step S1002 of FIG. 10 on a tile basis. In step S1201, the CPU 101 divides an original page into unit tiles. In this embodiment, the original page is divided into tiles each having 30 pixels in each of the vertical and horizontal directions. Here, first, a variable for setting an area number for each tile is set as Area_number[20][27]. The original page includes 600 pixels×800 pixels, as described above. Hence, the tiles each formed by 30 pixels in each of the vertical and horizontal directions include 20 tiles in the X direction×27 tiles in the Y direction.

FIG. 13 is a view showing an image of tile division of the original page according to this embodiment. An original page 1300 in FIG. 13 represents the whole original page. An area 1301 in FIG. 13 is an area in which a TEXT is drawn, an area 1302 is an area in which BOX is drawn, an area 1303 is an area in which IMAGE is drawn, and an area 1304 is an area in which none are drawn.

In step S1202, the CPU 101 determines, for each tile, whether it is a blank tile. This determination may be done based on the start point and the end point of the x- and y-coordinates in a drawing instruction or may be done by detecting tiles in which all pixel values in the actual unit tiles are R=G=B=255. Whether to determine based on the drawing instructions or determine based on the pixel values may be decided based on the processing speed and the detection accuracy.

In step S1203, the CPU 101 sets the initial values of the values as follows.

Area number "0" is set for a tile determined to be a blank tile in step S1202.
Area number "−1" is set for a tile (non-blank) other than above.
"0" is set to the area number maximum value.
More specifically, the setting is done in the following way.

| Blank tile (x1, y1) | area_number[x1][y1] = 0 |
| --- | --- |
| Non-blank tile (x2, y2) | area_number[x1][y1] = −1 |
| Area number maximum value | max_area_number = 0 |

That is, at the time of completion of the process of step S1203, all tiles are set to "0" or "−1".

In step S1204, the CPU 101 searches for a tile whose area number is "−1". More specifically, determination is performed for the ranges of x=0 to 19 and y=0 to 26 in the following way.

if (area_number[x][y]=−1)→detected
else→not detected

If an area with the area number "−1" is detected for the first time, the process advances to step S1205. At this time, in step S1205, the CPU 101 determines that a tile with the area number "−1" exists, and advances to step S1206. If the area numbers of all areas are not "−1", the CPU 101 determines, in step S1205, that there exists no tile with the area number "−1", and advances to step S1210.

In step S1206, the CPU 101 increments the area number maximum value by +1, and sets the area number of the tile to the updated area number maximum value. More specifically, the detected area (x3, y3) is processed in the following way.

max_area_number=max_area_number+1 area_number[x3][y3]=max_area_number

For example, here, since the area is an area detected for the first time after the process of step S1206 is executed for the first time, the area number maximum value is "1", and the area number of the tile is set to "1". From then on, every time the process of step S1206 is executed, the number of areas increases by one. After this, in steps S1207 to S1209, processing of expanding continuous non-blank areas as the same area is performed.

In step S1207, the CPU 101 searches for a tile that is a tile adjacent to the tile whose area number is the area number maximum value and has the area number "−1".

More specifically, the following determination is performed for the ranges of x=0 to 19 and y=0 to 26.

if (area_number[x][y]=max_area_number)
if ((area_number[x−1][y]=−1) or
(area_number[x+1][y]=−1) or
(area_number[x][y−1]=−1) or
(area_number[x][y+1]=−1)) detected
else→not detected If an adjacent area with the area number "−1" is detected for the first time, in step S1208, the CPU 101 determines that an adjacent area with the area number "−1" is detected, and advances to step S1209. On the other hand, If the area numbers of all areas are not "−1", the CPU 101 determines, in step S1208, that an adjacent area with the area number "−1" is not detected, and advances to step S1204.

In step S1209, the CPU 101 sets the area number of the tile that is the adjacent tile and has the area number "−1" to the area number maximum value. More specifically, this is implemented by setting, for the detected adjacent tile, the tile position of interest to (x4, y4) and performing processing in the following way.

if ((area_number[x4−1][y4]=−1)
area_number[x4−1][y4]=max_area_number
if ((area number[x4+1][y4]=−1)
area_number[x4+1][y4]=max_area_number
if ((area_number[x4][y4−1]=−1)
area_number[x4][y4−1]=max_area_number
if ((area number[x4][y4+1]=−1)
area_number[x4][y4+1]=max_area_number If the area number of the adjacent tile is updated in step S1209, the process returns to step S1207 to continue the search to check whether another adjacent non-blank tile exists. In a situation in which no adjacent non-blank tile exists, that is, if a tile to which the area number maximum value should be added does not exist, the process returns to step S1204.

In a state in which the area numbers of all areas are not "−1", that is, if all areas are blank areas, or any area number is set, the CPU 101 determines, in step S1205, that there exists no tile with the area number "−1", and advances to step S1210.

In step S1210, the CPU 101 sets the area number maximum value as the number of areas. That is, the area number maximum value set so far is the number of areas existing in the original page. Area division processing in the original page is thus ended.

Figure 14:
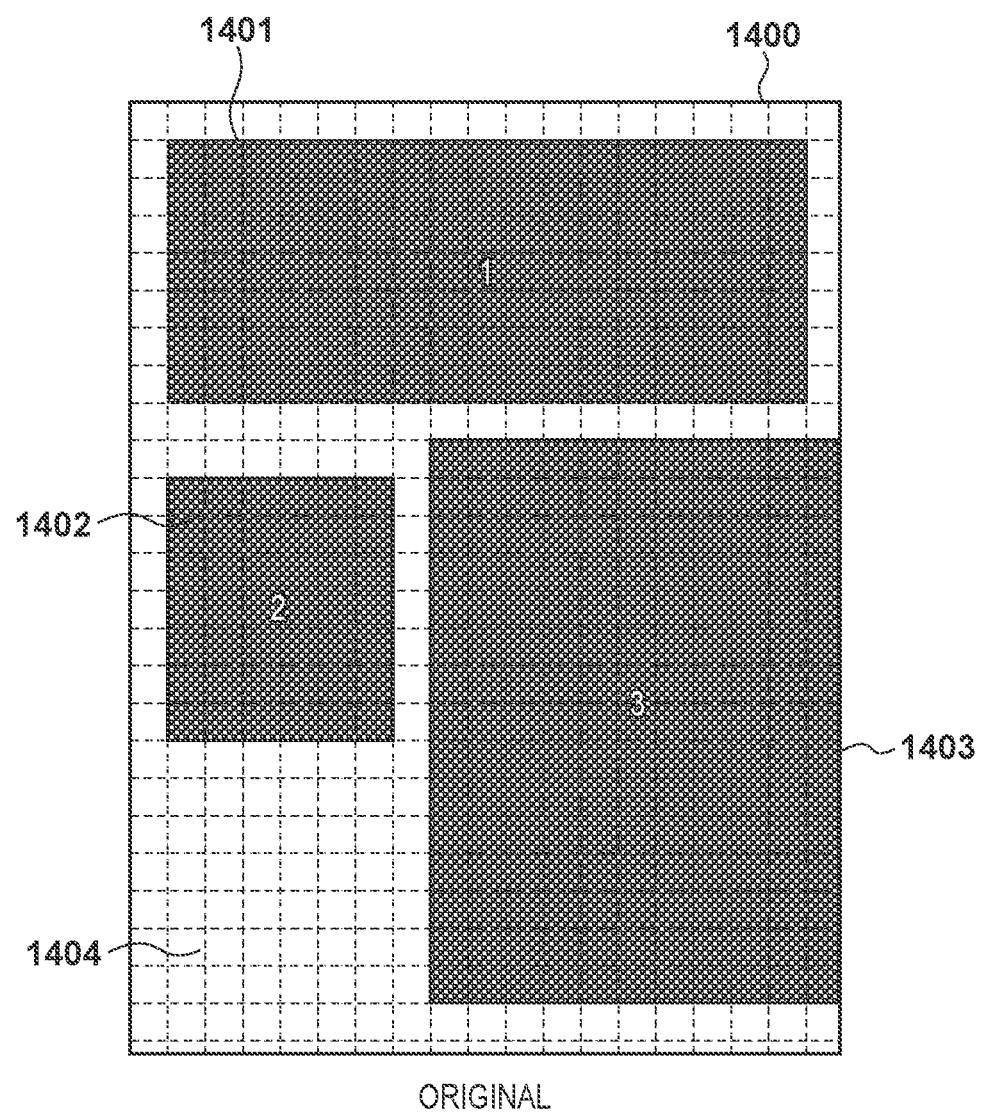
FIG. 14 is a view showing tile areas after area division.

FIG. 14 is a view showing tile areas after area division. An original page 1400 in FIG. 14 represents the whole original page. An area 1401 in FIG. 14 is an area in which a TEXT is drawn, an area 1402 is an area in which BOX is drawn, an area 1403 is an area in which IMAGE is drawn, and an area 1404 is an area in which none are drawn. Hence, the result of area division is as follows.

| Number of areas = 3 | |
|---|---|
| Area number = 0 | blank area 1404 |
| Area number = 1 | text area 1401 |
| Area number = 2 | box area 1402 |
| Area number = 3 | image area 1403 |

As shown in FIG. 14, the areas are spatially far apart via at least one blank tile. In other words, a plurality of tiles between which no blank tile intervenes are considered to be adjacent and processed as the same area.

As described above, in this embodiment, even in the same original page, portions spatially far apart are set as separated areas, and mapping suitable for each area is set, thereby implementing reduction of both lowering of chroma and lowering of the color difference.

Also, even in mapping table creation after area division in the same original page according to this embodiment, the effect of mapping table creation described in the first to third embodiments can be obtained. In addition, mapping table creation after area division in the same original page according to this embodiment and mapping table creation described in the first to third embodiments may be combined. As a result, in each page included in the original page and between pages, mapping for reducing lowering of chroma and mapping for reducing lowering of the color difference can be performed.

Here, the partial page described in the first to third embodiments and the area described in the fourth embodiment are each defined as a partial original for the original of the print target. In this case, the present disclosure can be said as a method of performing suitable color mapping by (1) and (2) below.
 (1) For each partial original, a color mapping method for each partial original to a print color gamut is decided based on pixel values included in each partial original and the print color gamut that can be reproduced in printing by a printing means.
 (2) Color conversion of partial original data is performed based on the decided color mapping method for each partial original.

In the first embodiment, "perceptual" mapping is performed for a partial original including color information outside the print color gamut, and "colorimetric" mapping is performed for a partial original that does not include color information outside the print color gamut, as described above. Also, in the second embodiment, "perceptual" mapping is performed for a partial original in which recognizable lowering of the color difference occurs, and "colorimetric" mapping is performed for a partial original in which recognizable lowering of the color difference does not occur, as described above.

In each embodiment, however, "colorimetric" mapping need not always be performed to obtain the effect of the present disclosure. If mapping close to "colorimetric" mapping rather than "perceptual" is used for a partial original that does not include color information outside the print color gamut, lowering of chroma can be suppressed as compared to a case where "perceptual" mapping is evenly performed for the entire original. Also, if mapping close to "colorimetric" rather than "perceptual" is used for a partial original in which recognizable lowering of the color difference does not occur, lowering of chroma can be suppressed as compared to a case where "perceptual" mapping is evenly performed for the entire original. More specifically, mapping whose degree of compression of the color space in the print color gamut is lower than in "perceptual" suffices. Here, in "colorimetric" mapping, the degree of compression of the color space in the print color gamut is zero (compression is not performed).

Mapping close to "colorimetric" rather than "perceptual" is implemented by, for example, setting a final output value calculated by the following equations for a pixel value.

Output value 1=pixel value after conversion by "perceptual" mapping

Output value 2=pixel value after conversion by "colorimetric" mapping

Final output value=(output value 1+output value 2)÷2

If the final output value is thus set for the pixel value, mapping in which the degree of compression of the color space in the print color gamut is half can be implemented. Mapping close to "colorimetric" rather than "perceptual" may be implemented by another method. For example, a final output value calculated by the following equation using arbitrary coefficient α (1 to 0) may be set for the pixel value.

Final output value=output value 1×α+output value 2×(1−α)

If the final output value is thus set for the pixel value, mapping in which the degree of compression of the color space in the print color gamut is a can be implemented.

In addition, the configurations of the partial page, and the method of area division and the color conversion method in each embodiment are not limited to the examples described in each embodiment, and another configuration may be used if the above-described effects can be obtained. Also, in each embodiment, a configuration executed for original data sent from the host PC 20 has been described. However, the processing according to each embodiment may be executed for read image data read by an image reading device such as a scanner provided in the MFP 10. In addition, the processing according to each embodiment is executed by the MFP 10, as described above. However, the processing may be executed by an application or a printer driver on the side of the host PC 20.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-170468, filed Oct. 18, 2021 and No. 2022-098198, filed Jun. 17, 2022, which are hereby incorporated by reference herein in their entirety.

What is claimed is:

1. An image processing apparatus comprising:
an acquisition unit configured to acquire original data of a print target of a print unit, which is formed by one page or a plurality of pages;
a division unit configured to divide the original data into a plurality of partial original data including at least a first partial original and a second partial original;
a decision unit configured to decide a first color mapping method to a print color gamut for the first partial original based on a pixel value included in the first partial original and the print color gamut of the print unit and further configured to decide a second color mapping method to the print color gamut for the second partial original based on a pixel value included in the second partial original and the print color gamut of the print unit;
a color conversion unit configured to perform color conversion of the first partial original by the first color mapping method decided by the decision unit, and perform color conversion of the second partial original by the second color mapping method decided by the decision unit; and
a setting unit configured to set a color gamut of a partial original corresponding to the partial original data,
wherein each of the first color mapping method and the second color mapping method is a color mapping method from the color gamut of the partial original data set by the setting unit to the print color gamut, and
the setting unit sets the print color gamut as a default color gamut, and if a pixel value of the partial original data is outside the print color gamut, the setting unit expands the default color gamut such that the default color gamut includes the pixel value outside the print color gamut, and sets the expanded color gamut as the color gamut of the partial original corresponding to the partial original data.

2. The apparatus according to claim 1, wherein each of the first color mapping method and the second color mapping method is defined as a color mapping method from a color gamut of a display to the print color gamut.

3. An image processing apparatus comprising:
an acquisition unit configured to acquire a pixel value from original data of a print target of a print unit, which is formed by a plurality of pages;
a decision unit configured to decide, based on the pixel value acquired by the acquisition unit and a print color gamut of the print unit, a color mapping method to the print color gamut for at least one of a page included in the plurality of pages and a portion in the page; and
a color conversion unit configured to perform color conversion of the original data by the color mapping method decided by the decision unit,
wherein a plurality of color mapping methods as a target to be decided by the decision unit include a first color mapping method of compressing a color space in the print color gamut, and a second color mapping method different from the first color mapping method,
the decision unit decides the color mapping method to the print color gamut based on whether a pixel value outside the print color gamut is included in a plurality of pixel values acquired by the acquisition unit, and
the decision unit decides the first color mapping method if the pixel value outside the print color gamut is included in the plurality of pixel values acquired by the acquisition unit, and decides the second color mapping method if the pixel value outside the print color gamut is not included in the plurality of pixel values acquired by the acquisition unit.

4. The apparatus according to claim 3, wherein in the second color mapping method, a degree of compression of the color space in the print color gamut is lower than in the first color mapping method.

5. The apparatus according to claim 3, wherein in the second color mapping method, compression of the color space is not performed in the print color gamut.

6. The apparatus according to claim 3, further comprising a determination unit configured to determine whether a first pixel value and a second pixel value acquired by the acquisition unit are pixel values outside the print color gamut, and the first pixel value and the second pixel value satisfy a condition,
wherein if it is determined by the determination unit that the condition is satisfied, the decision unit decides the first color mapping method.

7. The apparatus according to claim 6, wherein if it is determined by the determination unit that the condition is not satisfied, the decision unit decides the second color mapping method.

8. The apparatus according to claim 6, wherein the determination unit acquires a difference between a pixel value obtained by color-converting the first pixel value using the second color mapping method and a pixel value obtained by color-converting the second pixel value using the second color mapping method, and if the difference falls within a predetermined range, determines that the condition is satisfied.

9. The apparatus according to claim 8, wherein if the difference does not fall within the predetermined range, the determination unit determines that the condition is not satisfied.

10. The apparatus according to claim 3, wherein each of the first color mapping method and the second color mapping method is defined as a color mapping method from a color gamut of a display to the print color gamut.

11. The apparatus according to claim 3, further comprising a setting unit configured to set a color gamut corresponding to the original data,
wherein each of the first color mapping method and the second color mapping method is a color mapping method from the color gamut set by the setting unit to the print color gamut.

12. The apparatus according to claim 11, wherein the setting unit sets the print color gamut as a default color gamut, and if a pixel value acquired by the acquisition unit is outside the print color gamut, expands the default color gamut such that the default color gamut includes the pixel value outside the print color gamut, and sets the expanded color gamut as the color gamut corresponding to the original data.

13. The apparatus according to claim 3, wherein the decision unit sets a double-page spread in double-sided printing, which is included in the plurality of pages, to the target.

14. The apparatus according to claim 3, further comprising a division unit configured to divide the page into a plurality of areas,
wherein the decision unit decides the color mapping method to the print color gamut for each of a first area and a second area divided by the division unit.

15. The apparatus according to claim 14, wherein the plurality of areas include at least one of a text area, a box area, and an image area.

16. The apparatus according to claim 3, further comprising a print control unit configured to cause the print unit to perform printing based on the original data converted by the color conversion unit.

17. The apparatus according to claim 3, wherein the image processing apparatus includes the print unit.

18. An image processing method comprising:
acquiring original data of a print target of a print unit, which is formed by one page or a plurality of pages;
dividing the original data into a plurality of partial original data including at least a first partial original and a second partial original;
deciding a first color mapping method to a print color gamut for the first partial original based on a pixel value included in the first partial original and the print color gamut of the print unit;
deciding a second color mapping method to the print color gamut for the second partial original based on a pixel value included in the second partial original and the print color gamut of the print unit;
performing color conversion of the first partial original by the first color mapping method;
performing color conversion of the second partial original by the second color mapping method decided by the decision unit; and
setting a color gamut of a partial original corresponding to the partial original data,
wherein each of the first color mapping method and the second color mapping method is a color mapping method from the color gamut of the partial original data to the print color gamut, and
in the setting of a color gamut, the print color gamut is set as a default color gamut, and if a pixel value of the partial original data is outside the print color gamut, the default color gamut is expanded such that the default color gamut includes the pixel value outside the print color gamut, and the expanded color gamut is set as the color gamut of the partial original corresponding to the partial original data.

19. A non-transitory computer-readable storage medium storing a program configured to cause a computer to function to:
acquire original data of a print target of a print unit, which is formed by one page or a plurality of pages;
divide the original data into a plurality of partial original data including at least a first partial original and a second partial original;
decide a first color mapping method to a print color gamut for the first partial original based on a pixel value included in the first partial original and the print color gamut of the print unit;
decide a second color mapping method to the print color gamut for the second partial original based on a pixel value included in the second partial original and the print color gamut of the print unit;
perform color conversion of the first partial original by the first color mapping method;
perform color conversion of the second partial original by the second color mapping method decided by the decision unit; and
set a color gamut of a partial original corresponding to the partial original data,
wherein each of the first color mapping method and the second color mapping method is a color mapping method from the color gamut of the partial original data to the print color gamut, and
in the setting of a color gamut, the print color gamut is set as a default color gamut, and if a pixel value of the partial original data is outside the print color gamut, the default color gamut is expanded such that the default color gamut includes the pixel value outside the print color gamut, and the expanded color gamut is set as the color gamut of the partial original corresponding to the partial original data.

20. An image processing apparatus comprising:
an acquisition unit configured to acquire a pixel value from original data of a print target of a print unit, which is formed by a plurality of pages;
a decision unit configured to decide, based on the pixel value acquired by the acquisition unit and a print color gamut of the print unit, a color mapping method to the print color gamut for at least one of a page included in the plurality of pages and a portion in the page;
a color conversion unit configured to perform color conversion of the original data by the color mapping method decided by the decision unit; and
a determination unit configured to determine whether a first pixel value and a second pixel value acquired by the acquisition unit are pixel values outside the print color gamut, and to determine whether the first pixel value and the second pixel value satisfy a condition,
wherein a plurality of color mapping methods as a target to be decided by the decision unit include a first color mapping method of compressing a color space in the print color gamut, and a second color mapping method different from the first color mapping method,
the decision unit decides the color mapping method to the print color gamut based on whether a pixel value outside the print color gamut is included in a plurality of pixel values acquired by the acquisition unit, and
if it is determined by the determination unit that the condition is satisfied, the decision unit decides the first color mapping method.

21. The apparatus according to claim 20, wherein if it is determined by the determination unit that the condition is not satisfied, the decision unit decides the second color mapping method.

22. The apparatus according to claim 20, wherein the determination unit acquires a difference between a pixel value obtained by color-converting the first pixel value using the second color mapping method and a pixel value obtained by color-converting the second pixel value using the second color mapping method, and if the difference falls within a predetermined range, determines that the condition is satisfied.

23. The apparatus according to claim 22, wherein if the difference does not fall within the predetermined range, the determination unit determines that the condition is not satisfied.

24. An image processing apparatus comprising:
an acquisition unit configured to acquire a pixel value from original data of a print target of a print unit, which is formed by a plurality of pages;
a decision unit configured to decide, based on the pixel value acquired by the acquisition unit and a print color gamut of the print unit, a color mapping method to the print color gamut for at least one of a page included in the plurality of pages and a portion in the page;
a color conversion unit configured to perform color conversion of the original data by the color mapping method decided by the decision unit; and
a setting unit configured to set a color gamut corresponding to the original data,
wherein a plurality of color mapping methods as a target to be decided by the decision unit include a first color mapping method of compressing a color space in the print color gamut, and a second color mapping method different from the first color mapping method,
the decision unit decides the color mapping method to the print color gamut based on whether a pixel value outside the print color gamut is included in a plurality of pixel values acquired by the acquisition unit,
each of the first color mapping method and the second color mapping method is a color mapping method from the color gamut set by the setting unit to the print color gamut, and
the setting unit sets the print color gamut as a default color gamut, and if a pixel value acquired by the acquisition unit is outside the print color gamut, the setting unit expands the default color gamut such that the default color gamut includes the pixel value outside the print color gamut, and sets the expanded color gamut as the color gamut corresponding to the original data.

25. An image processing method comprising:
acquiring a pixel value from original data of a print target of a print unit, which is formed by a plurality of pages;
deciding, based on the acquired pixel value and a print color gamut of the print unit, a color mapping method to the print color gamut for at least one of a page included in the plurality of pages and a portion in the page; and
performing color conversion of the original data by the decided color mapping method,
wherein in the deciding of a color mapping method, a plurality of color mapping methods as a target to be decided include a first color mapping method of compressing a color space in the print color gamut, and a second color mapping method different from the first color mapping method,
in the deciding of a color mapping method, the color mapping method to the print color gamut is decided based on whether a pixel value outside the print color gamut is included in a plurality of acquired pixel values, and
in the deciding of a color mapping method, the first color mapping method is decided if the pixel value outside the print color gamut is included in the plurality of acquired pixel values, and the second color mapping method is decided if the pixel value outside the print color gamut is not included in the plurality of acquired pixel values.

26. An image processing method comprising:
acquiring a pixel value from original data of a print target of a print unit, which is formed by a plurality of pages;
deciding, based on the acquired pixel value and a print color gamut of the print unit, a color mapping method to the print color gamut for at least one of a page included in the plurality of pages and a portion in the page;
performing color conversion of the original data by the decided color mapping method;
determining whether an acquired first pixel value and an acquired second pixel value are pixel values outside the print color gamut; and
determining whether the first pixel value and the second pixel value satisfy a condition,
wherein in the deciding of a color mapping method, a plurality of color mapping methods as a target include a first color mapping method of compressing a color space in the print color gamut, and a second color mapping method different from the first color mapping method,
wherein in the deciding of a color mapping method, the color mapping method to the print color gamut is decided based on whether a pixel value outside the print color gamut is included in a plurality of acquired pixel values, and
wherein in the deciding of a color mapping method, if it is determined in the determining that the condition is satisfied, the first color mapping method is decided.

* * * * *